United States Patent
Carter

(10) Patent No.: US 10,157,604 B1
(45) Date of Patent: Dec. 18, 2018

(54) SOUND MASKING SYSTEM WITH IMPROVED HIGH-FREQUENCY SPATIAL UNIFORMITY

(71) Applicant: Plantronics, Inc., Santa Cruz, CA (US)

(72) Inventor: Benjamin Alvarado Carter, Santa Cruz, CA (US)

(73) Assignee: Plantronics, Inc., Santa Cruz, CA (US)

( * ) Notice: Subject to any disclaimer, the term of this patent is extended or adjusted under 35 U.S.C. 154(b) by 0 days.

(21) Appl. No.: 15/860,350

(22) Filed: Jan. 2, 2018

(51) Int. Cl.
| | |
|---|---|
| H04R 3/02 | (2006.01) |
| G10K 11/175 | (2006.01) |
| G06F 3/16 | (2006.01) |
| H04R 3/12 | (2006.01) |
| H04R 29/00 | (2006.01) |
| H04N 9/802 | (2006.01) |
| H04R 1/40 | (2006.01) |
| G06F 3/0482 | (2013.01) |

(52) U.S. Cl.
CPC ............ *G10K 11/175* (2013.01); *G06F 3/165* (2013.01); *H04N 9/802* (2013.01); *H04R 1/403* (2013.01); *H04R 3/12* (2013.01); *H04R 29/002* (2013.01); *G06F 3/0482* (2013.01); *G10H 2250/411* (2013.01); *H04R 2430/01* (2013.01)

(58) Field of Classification Search
CPC ........................................................ H04R 3/02
See application file for complete search history.

(56) References Cited

U.S. PATENT DOCUMENTS

| | | | |
|---|---|---|---|
| 4,052,720 A | 10/1977 | McGregor et al. | |
| 4,438,526 A | 3/1984 | Thomalla | |
| 4,891,842 A | 1/1990 | Green | |
| 4,923,032 A | 5/1990 | Nuernberger | |
| 5,574,796 A | 11/1996 | Keezer | |
| 5,952,619 A | 9/1999 | Kantor et al. | |
| 6,888,945 B2 | 5/2005 | Horrall | |
| 6,944,312 B2 | 9/2005 | Mason et al. | |
| 7,194,094 B2 | 3/2007 | Horrall et al. | |
| 7,324,656 B2 | 1/2008 | Iwayama et al. | |
| 7,916,878 B2 * | 3/2011 | Bank | H04R 7/10 381/152 |
| 2007/0133816 A1 | 6/2007 | Horrall et al. | |
| 2015/0181332 A1 * | 6/2015 | Benway | H04R 3/002 381/73.1 |
| 2017/0287460 A1 * | 10/2017 | Stewart | G10K 11/178 |

OTHER PUBLICATIONS

Harris et al., "A Balanced Modal Radiator (BMR)," Audio Engineering Society Convention 119, Audio Engineering Society, Oct. 7-10, 2005, pp. 1-7.

(Continued)

*Primary Examiner* — Olisa Anwah
(74) *Attorney, Agent, or Firm* — Chuang Intellectual Property Law

(57) ABSTRACT

Methods and apparatuses for addressing open space noise are disclosed. In one example, a system and method for masking open space noise includes outputting a noise masking sound from a plurality of balanced mode radiator loudspeakers distributed in a down-fire direction above an open space.

27 Claims, 22 Drawing Sheets

(56) References Cited

OTHER PUBLICATIONS

Harris, "Achieving Real Bandwidth Beyond 20 kHz with a Loudspeaker System," Audio Engineering Society Conference: 31st International Conference: New Directions in High Resolution Audio. Audio Engineering Society, Jun. 25-27, 2007, pp. 1-5.
Unknown, "TEBM35C10-4 Miniature BMR® Driver," Tectonic Elements, 2016, found at URL <http://www.tectonicelements.com/wp-content/uploads/2016/02/TEL-DS-TEBM35C10-4.pdf>,3 pages.
Unknown, "TEBM46C20N-4B Balanced Mode Radiator," Tectonic Elements, 2014, found at URL <http://www.tectonicelements.com/wp-content/uploads/2014/05/TEL-DS-TEBM46C20N-4B-2.pdf>, 2 pages.
Unknown, "TEBM46C20N-4B Polar Response Data," Tectonic Audio Labs, 2017, 2 pages.
Ferekidis et al., "The Naim Balanced Mode Radiator, The Naim Ovator Bass Driver," found at URL <https://www.naimaudio.com/sites/default/files/products/downloads/files/naim_ovator-s-600_bmr_white-paper_may2009.pdf>, May 2009, 8 pages.
Beranek, "Acoustics," Book, 1954, pp. 100-107, McGraw-Hill, New York.
Beranek et al., "Acoustics: Sound Fields and Transducers," Book, 2012, pp. 175-178, 270-275, Academic Press, 2012.

\* cited by examiner

BMR Speaker
DIRECTIVITY AT 2kHZ (BMR)    (LEFT HALF)

| Angle | Dispersion (measured) | Distance L (fixed) | Total Loss (sum) |
|---|---|---|---|
| 0 | 0 | 0 | 0 |
| 5 | -0.5 | 0 | -0.5 |
| 10 | -1 | -0.1 | -1.1 |
| 15 | -1 | -0.3 | -1.3 |
| 20 | -1 | -0.5 | -1.5 |
| 25 | -0.5 | -0.9 | -1.4 |
| 30 | -0.5 | -1.3 | -1.8 |
| 35 | 0 | -1.7 | -1.7 |
| 40 | 0 | -2.3 | -2.3 |
| 45 | -0.5 | -3 | -3.5 |
| 50 | -0.5 | -3.8 | -4.3 |
| 55 | -1 | -4.8 | -5.8 |
| 60 | -2 | -6 | -8 |

Interpolate, angle at which Dispersion + Distance = -6 dB: 55.5

BMR (left half): 111-degree Linear Dispersion @ 2kHz

DIRECTIVITY AT 2kHZ (BMR)    (RIGHT HALF)

| Angle | Dispersion (measured) | Distance L (fixed) | Total Loss (sum) |
|---|---|---|---|
| 0 | 0 | 0 | 0 |
| 5 | 0 | 0 | 0 |
| 10 | 0 | -0.1 | -0.1 |
| 15 | 0 | -0.3 | -0.3 |
| 20 | 0 | -0.5 | -0.5 |
| 25 | 0 | -0.9 | -0.9 |
| 30 | 0 | -1.3 | -1.3 |
| 35 | 0 | -1.7 | -1.7 |
| 40 | 0 | -2.3 | -2.3 |
| 45 | 0 | -3 | -3 |
| 50 | -0.5 | -3.8 | -4.3 |
| 55 | -1 | -4.8 | -5.8 |
| 60 | -1.5 | -6 | -7.5 |

Interpolate, angle at which Dispersion + Distance = -6 dB: 55.6

BMR (right half): 112-degree Linear Dispersion @ 2kHz

AVERAGE LINEAR DISPERSION (2 kHz), LEFT and RIGHT SIDES = 111.5

FIG. 13A

Dome Speaker

DIRECTIVITY AT 2kHZ (DOME)　　　　　　(LEFT HALF)

| Angle | Dispersion (measured) | Distance L (fixed) | Total Loss (sum) |
|---|---|---|---|
| 0 | 0 | 0 | 0 |
| 5 | -1 | 0 | -1 |
| 10 | -1.5 | -0.1 | -1.6 |
| 15 | -2 | -0.3 | -2.3 |
| 20 | -3 | -0.5 | -3.5 |
| 25 | -3 | -0.9 | -3.9 |
| 30 | -3 | -1.3 | -4.3 |
| 35 | -3 | -1.7 | -4.7 |
| 40 | -3 | -2.3 | -5.3 |
| 45 | -3.5 | -3 | -6.5 |
| 50 | -3.5 | -3.8 | -7.3 |
| 55 | -4 | -4.8 | -8.8 |
| 60 | -4 | -6 | -10 |

Interpolate, angle at which Dispersion + Distance = -6 dB: 42.9
Dome (left half): 86-degree Linear Dispersion @ 2kHz DIRECTIVITY AT 2kHZ (DOME)　　　　　　(RIGHT HALF)

| Angle | Dispersion (measured) | Distance L (fixed) | Total Loss (sum) |
|---|---|---|---|
| 0 | 0 | 0 | 0 |
| 5 | 0 | 0 | 0 |
| 10 | 0 | -0.1 | -0.1 |
| 15 | 0 | -0.3 | -0.3 |
| 20 | 0 | -0.5 | -0.5 |
| 25 | -0.5 | -0.9 | -1.4 |
| 30 | -1 | -1.3 | -2.3 |
| 35 | -1.5 | -1.7 | -3.2 |
| 40 | -2 | -2.3 | -4.3 |
| 45 | -2 | -3 | -5 |
| 50 | -2 | -3.8 | -5.8 |
| 55 | -3 | -4.8 | -7.8 |
| 60 | -3 | -6 | -9 |

Interpolate, angle at which Dispersion + Distance = -6 dB: 50.5
Dome (right half): 101-degree Linear Dispersion @ 2kHz

AVERAGE LINEAR DISPERSION (2 kHz), LEFT and RIGHT SIDES: 93.5

FIG. 13B

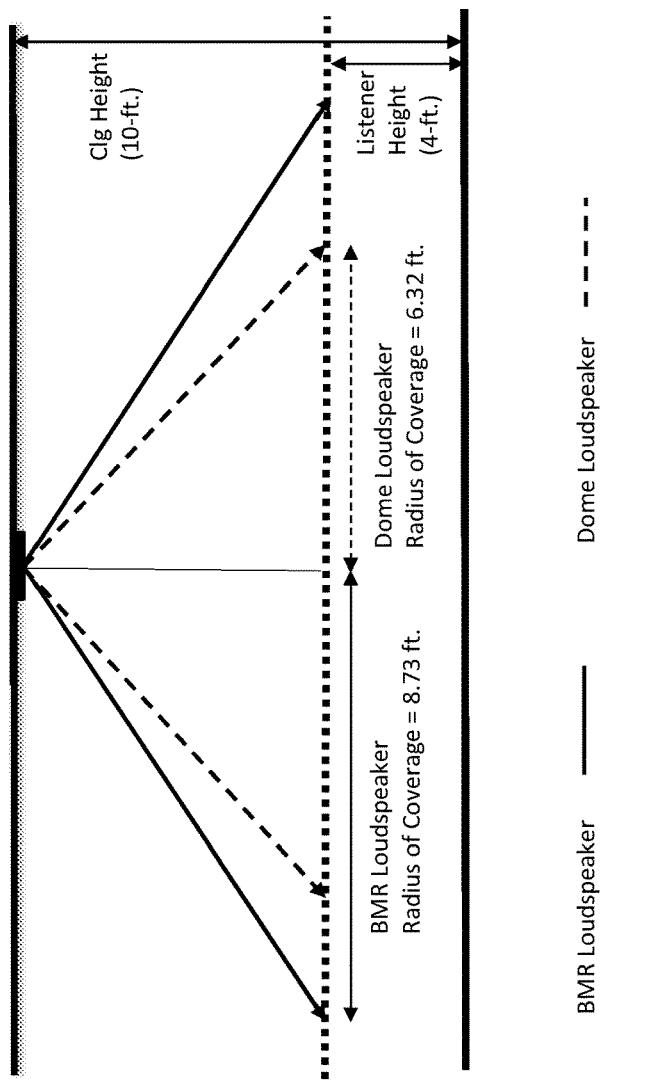

Radius of Coverage - Down-Fire/In-Tile Speaker

BMR Loudspeaker

| | |
|---|---|
| Ceiling Height "C" (ft.) | 10 |
| Listener Height "L" (ft.) | 4 |
| Linear Dispersion Angle @ 2kHz (deg) | 111 |
| Distance from Speaker to Listener (ft.) | 6 |
| Radius of Coverage at Listener Height "R" | 8.73 |
| Diameter | 17.46 |
| Area | 239.43 |

Dome Loudspeaker

| | |
|---|---|
| Ceiling Height "C" (ft.) | 10 |
| Listener Height "L" (ft.) | 4 |
| Linear Dispersion Angle @ 2kHz (deg) | 93 |
| Distance from Speaker to Listener (ft.) | 6 |
| Radius of Coverage at Listener Height "R" | 6.32 |
| Diameter | 12.65 |
| Area | 125.59 |

FIG. 14C

BMR Loudspeaker
Area of Space: 10000 sq. ft.
Ceiling Height: 10 ft.
Listener Height: 4 ft.
Edge-to-Edge Coverage (2 kHz)
Rad of Coverage: 8.73 ft.
On Center Spacing: 17.5 ft.

36 SPEAKERS

| Assumptions | |
|---|---|
| Ceiling Height: | 10 ft. |
| Listener Height: | 4 ft. |
| Area of Space: | 10000 sq. ft. |
| Coverage Pattern: | edge-to-edge |

| Speaker | Measured Conical Dispersion @ 2kHz (deg) | Calculated Linear Dispersion @ 2 kHz (deg) | Radius of Coverage (ft.) | Spacing between Speakers (ft.) | Number of Speakers for Space |
|---|---|---|---|---|---|
| BMR 60-mm | 170 | 111 | 8.73 | 17.5 | 36 |
| Dome 31-mm | 140 | 93 | 6.32 | 12.7 | 64 |

FIG. 16C

SOUND MASKING SYSTEM WITH IMPROVED HIGH-FREQUENCY SPATIAL UNIFORMITY

BACKGROUND OF THE INVENTION

Noise within an open space is problematic for people working within the open space. Open space noise is typically described by workers as unpleasant and uncomfortable. Speech noise, printer noise, telephone ringer noise, and other distracting sounds increase discomfort. This discomfort can be measured using subjective questionnaires as well as objective measures, such as cortisol levels.

For example, many office buildings utilize a large open office area in which many employees work in cubicles with low cubicle walls or at workstations without any acoustical barriers. Open space noise, and in particular speech noise, is the top complaint of office workers about their offices. One reason for this is that speech enters readily into the brain's working memory and is therefore highly distracting. Even speech at very low levels can be highly distracting when ambient noise levels are low (as in the case of someone having a conversation in a library). Productivity losses due to speech noise have been shown in peer-reviewed laboratory studies to be as high as 41%.

Another major issue with open offices relates to speech privacy. Workers in open offices often feel that their telephone calls or in-person conversations can be overheard. Speech privacy correlates directly to intelligibility. Lack of speech privacy creates measurable increases in stress and dissatisfaction among workers.

In the prior art, noise-absorbing ceiling tiles, carpeting, screens, and furniture have been used to decrease office noise levels. Reducing the noise levels does not, however, directly solve the problems associated with the intelligibility of speech. Speech intelligibility can be unaffected, or even increased, by these noise reduction measures. As office densification accelerates, problems caused by open space noise become accentuated.

As a result, improved methods and apparatuses for addressing open space noise are needed.

BRIEF DESCRIPTION OF THE DRAWINGS

The present invention will be readily understood by the following detailed description in conjunction with the accompanying drawings, wherein like reference numerals designate like structural elements.

FIG. 13A and FIG. 13B illustrate calculation of the linear dispersion for the BMR speaker and dome speaker, respectively.

FIG. 14C illustrates the improved radius of coverage of the BMR speaker over the dome speaker.

FIG. 16C illustrates a summary table of the data shown in FIGS. 16A and 16B.

DESCRIPTION OF SPECIFIC EMBODIMENTS

Figure 1:
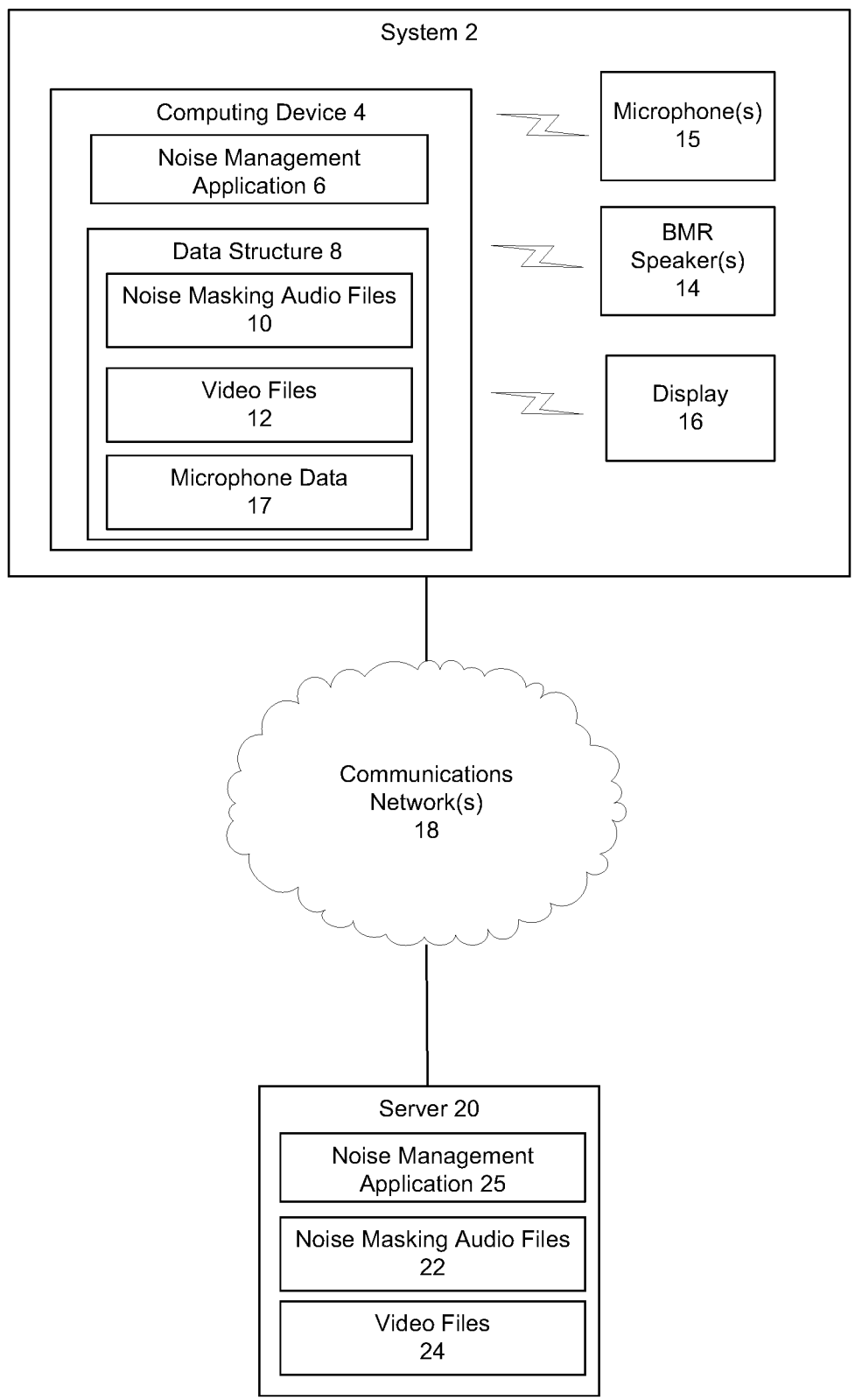
FIG. 1 illustrates a system for sound masking in one example.

Methods and apparatuses for masking open space noise are disclosed. The following description is presented to enable any person skilled in the art to make and use the invention. Descriptions of specific embodiments and applications are provided only as examples and various modifications will be readily apparent to those skilled in the art. The general principles defined herein may be applied to other embodiments and applications without departing from the spirit and scope of the invention. Thus, the present invention is to be accorded the widest scope encompassing numerous alternatives, modifications and equivalents consistent with the principles and features disclosed herein.

Block diagrams of example systems are illustrated and described for purposes of explanation. The functionality that is described as being performed by a single system component may be performed by multiple components. Similarly, a single component may be configured to perform functionality that is described as being performed by multiple components. For purpose of clarity, details relating to technical material that is known in the technical fields related to the invention have not been described in detail so as not to unnecessarily obscure the present invention. It is to be understood that various examples of the invention, although different, are not necessarily mutually exclusive. Thus, a particular feature, characteristic, or structure described in one example embodiment may be included within other embodiments.

"Sound masking" (also referred to as "noise masking") is the introduction of sound or constant background noise (referred to herein as "noise masking sound") in a space in order to reduce speech intelligibility, increase speech privacy, and increase acoustical comfort. For example, the introduced noise masking sound may be a nature associated sound, such as flowing water or birdsong. For example, the noise masking sound may be a pink noise, filtered pink noise, brown noise, or other similar random noise (herein referred to simply as "pink noise") injected into the open office. Pink noise and nature associated sounds are both effective in reducing speech intelligibility, increasing speech privacy, and increasing acoustical comfort.

Sound masking systems may be one of two configurations, depending upon where and how the loudspeakers are placed and directed: (1) in-plenum, and (2) direct field. In-plenum configurations utilize speakers installed in the plenum (the area between the ceiling tiles and the ceiling deck) oriented to produce a masking sound that is broadcast upwards toward the ceiling. The sound is directed upwards so that it reflects off of the ceiling deck and is returned back toward the ground through the ceiling tiles with increased diffusion. Creating a more diffuse sound decreases the ability of the worker to identify the location of the speakers, and reduces the creation of "hot" and "cold" spots, where the masking sound is loud or quiet enough to be highly noticeable.

However, in relying on reflections off of the ceiling deck, in-plenum configurations suffer from several disadvantages. These disadvantages include (1) increased power requirements to drive the loudspeakers because sound is directed in a direction opposite the worker open space and may be absorbed by the ceiling deck, (2) intervening structures within the plenum, such as HVAC ducts, absorb sound and cause un-predictable and non-uniform reflections (3) non-uniformity and unknowability of the ceiling deck material and resulting ability to reflect or absorb sound.

In contrast, direct field (herein also referred to as "down-fire") configurations place the loudspeakers within the ceiling tiles or hung as pendants oriented to output sound downwards (i.e., down-fire) so that the speaker sound travels directly to the workers below. The inventor has recognized that spatial uniformity is a critical problem which must be addressed to achieve optimal performance of down-fire sound masking systems. A primary goal of a sound masking system is to provide sufficient spatial uniformity of audio such that a listener walking through the space does not notice changes in the sound masking audio level and spectrum. As such, when used in sound masking systems, loudspeakers have different desired performance characteristics and requirements than a typical entertainment application such as a stationary user listening to music. The inventor has recognized and identified key desired loudspeaker operational parameters as described herein for sound masking applications when the listener is mobile within a series of distributed speakers.

Spatial uniformity is accomplished by spacing the loudspeakers in the ceiling such that the coverage pattern from one loudspeaker at frequencies of interest abuts or slightly overlaps the coverage pattern from the adjacent loudspeakers at a listener's ear height. The inventor has recognized that spatial uniformity of coverage at a listener's ear height due to a grid of distributed loudspeakers in a ceiling is dependent primarily upon the loudspeakers' directivity at frequencies of interest and the spacing between the speakers. Effective frequencies for reducing speech intelligibility via sound masking include those one-third octave frequency bands that contribute most to speech intelligibility (and thus are more important for masking speech), namely, and respectively, 2 kHz, 1.6 kHz, 2.5 kHz, 3.15 kHz, 1 kHz, and 4 kHz. Low-frequency content in the sound masking audio is also desirable to create a more natural-sounding and acceptable sound field.

The inventor has also recognized that the use of conventional pistonic loudspeakers (e.g., cone loudspeakers or dome loudspeakers) in down-fire sound masking applications poses several problems, including inherent undesirable performance characteristics which reduce their effectiveness. Undesirably, conventional pistonic loudspeakers become directive as the emitted frequency is increased. "ka" is a dimensionless product of the wavenumber k (2*pi/wavelength) and diaphragm radius a. When ka<0.5, the loudspeaker behaves like a point source (omnidirectional). When ka>3, the loudspeaker is considered highly directional. These conventional pistonic speakers suffer from high-frequency beaming which yields a non-uniform spectrum when placed at conventional sound masking loudspeaker spacing, thereby diminishing spatial uniformity.

High-frequency "beaming" of conventional pistonic loudspeakers distributed within a ceiling contributes to an imbalance of spatial uniformity at these higher frequencies, particularly when the loudspeakers are operating in a down-fire mode. This "beaming" emphasizes high-frequencies on-axis, which diminish more quickly than lower (more omni-directional) frequencies as one moves off-axis. Spatial uniformity at these higher frequencies is difficult to realize using conventional pistonic loudspeakers in a down-fire configuration.

Achieving less directivity at high frequencies (and thus yielding more uniform coverage in a sound masking system) is highly desirable but requires that the pistonic loudspeaker diaphragm shrink considerably. Shrinking the diaphragm reduces low-frequency sensitivity as the diaphragm becomes physically less able to move air, which is undesirable. This phenomenon of increased directivity with rising frequency ("beaming") is the reason that many loudspeaker systems incorporate a woofer, a tweeter, and a crossover circuit. These types of loudspeaker systems are more complex and expensive. The inventor has recognized what is needed for distributed sound masking systems is a loudspeaker that exhibits both sufficient low-frequency output and less directive high-frequency output without requiring two separate loudspeakers in a single enclosure and a crossover.

The inventor has identified an improved sound masking system that provides enhanced spatial uniformity for a desired sound masking spectrum is realized by utilizing loudspeakers which exhibit less directivity at high frequencies while still maintaining practical low-frequency sensitivity. In one embodiment, a balanced-mode radiator (BMR) is utilized to provide high-frequency (e.g., ≥2 kHz) spectral uniformity at a listener's ear height in a distributed down-fire sound masking system. The BMR loudspeaker acoustically behaves more similarly to ideal "point sources" than conventional pistonic loudspeakers. The BMR loudspeaker employs modal radiation at higher frequencies, which does not suffer from "beaming" found in conventional pistonic loudspeakers.

Advantageously, the sound masking system with distributed BMR loudspeakers provides wider high-frequency dispersion, greater low-frequency sensitivity, and much greater mid-range sensitivity in a down-fire sound masking system. As such, a distributed sound masking system utilizing down-fire BMR loudspeakers implemented within a ceiling plane provide better spatial uniformity with regards to frequencies that are effective at masking speech than prior art systems. Furthermore, unlike conventional pistonic speakers, BMR loudspeakers maintain excellent high frequency dispersion at increased diameter sizes, thereby allowing systems to use larger speakers which offer both excellent high frequency dispersion and better lower frequency response.

The described methods and systems offer several advantages. The distributed sound masking system utilizing downfire BMR loudspeakers provides (1) wider high-frequency dispersion which allows for better spatial uniformity at frequencies most important for masking speech, (2) wider high-frequency dispersion which enhances the subjective realism of non-traditional masking sounds, such as recordings of running water (e.g., streams, creeks, rivers), and other nature sounds, (3) reduced overall system costs of goods sold because BMR loudspeakers are full-range loudspeakers that obviate the need for a tweeter, woofer, and crossover circuit, and (4) higher mid-frequency sensitivity (1 kHz) means that less power is required to achieve the same sound pressure level.

In one example embodiment of the invention, a method for masking open space noise includes outputting a noise masking sound from a plurality of balanced mode radiator loudspeakers distributed in a down-fire direction above an open space. In one example, the method further includes displaying a visual corresponding to the noise masking sound.

In one example embodiment, a system for masking open space noise includes a plurality of balanced mode radiator loudspeakers, each balanced mode radiator loudspeaker arranged above an open space in a down-fire configuration to output a speaker sound downward into the open space. Each balanced mode radiator loudspeaker includes a voice coil, a diaphragm, and one or more mass objects coupled to the diaphragm. The system includes a display device disposed in the open space.

The system further includes one or more computing devices including one or more processors and one or more memories. The one or more memories store one or more selectable noise masking sound audio files and one or more selectable video files. The one or more memories further store one or more application programs executable by the one or more processors configured to output a noise masking sound audio file selected from the one or more selectable noise masking sound audio files at the plurality of balanced mode radiator loudspeakers and output a video file selected from the one or more selectable video files at the display device.

In one example embodiment, a system for masking open space noise includes a plurality of balanced mode radiator loudspeakers arranged above an open space to output a noise masking sound in a down-fire direction. Each balanced mode radiator loudspeaker of the plurality of balanced mode radiator loudspeakers comprising a voice coil, a diaphragm, and one or more mass objects coupled to the diaphragm. The system includes a plurality of microphones. The system further includes one or more computing devices including one or more processors and one or more memories storing one or more application programs executable by the one or more processors. The one or more application programs include instructions to receive a microphone data from at least one of the plurality of microphones and adjust the noise masking sound output at one or more of the plurality of balanced mode radiator loudspeakers.

FIG. 1 illustrates a system 2 for sound masking in one example. The sound masking may include, for example, outputting noise masking sounds. System 2 includes a computing device 4, BMR loudspeakers 14 arranged to output a speaker sound in an open space, microphones 15, and video display 16 disposed in the open space. Computing device 4 may for example be a laptop, tablet computer, desktop personal computer, server, or smartphone. Computing device 4 stores selectable noise masking sound audio files 10 and selectable video files 12. Computing device 4 further stores a noise management application 6 configured to receive a user selection or automatically select a noise masking sound audio file from the selectable noise masking sound audio files 10 and a video file from the selectable video files 12. Noise management application 6 includes or interfaces with a digital audio player and a digital video player at computing device 4. Noise management application 6 outputs (i.e., plays) the selected noise masking sound audio file at BMR loudspeakers 14 and outputs (i.e., plays) the selected video file at video display 16. Although only a single video display 16 is shown, multiple displays may be utilized to output the selected video file.

In one example embodiment, noise management application 6 interfaces with microphones 15 to receive microphone data 17. The microphone data 17 may be any data which can be derived from processing sound detected at a microphone. For example, the microphone data 17 may include noise level measurements, frequency distribution data, or voice activity detection data determined from sound detected at the one or more microphones 15. Furthermore, in addition to or in alternative to, the microphone data 17 may include the sound itself (e.g., a stream of digital audio data).

Balanced mode radiator loudspeakers 14 are disposed above an open space and arranged to direct the speaker sound in a down-fire direction directly into the open space. In one example, BMR loudspeakers 14 are a plurality of speakers disposed at varying distances from the video display 16. An output level of the speaker sound from a speaker may be adjusted based on the distance of the speaker from the video display 16. In one example, video display 16 may be visible from any location within the open space.

In one example, a server 20 is capable of communications with computing device 4 via one or more communication network(s) 18 utilizing wired or wireless network connections. For example, communication network(s) 18 may include an Internet Protocol (IP) network, cellular communications network, public switched telephone network, IEEE 802.11 wireless network, Bluetooth network, or any combination thereof.

Server 20 includes a sound masking application 25 and stores noise masking audio files 22 and video files 24. In one example, the sound masking application 25 is configured to transmit one or more of noise masking audio files 22 and video files 24 to computing device 4 upon request by noise management application 6 at computing device 4. In one example, noise masking audio files 22 and video files 24 are stored in data structure 8. In a further example, noise masking audio files 22 and video files 24 are streamed to noise management application 6 for direct output to BMR loudspeakers 14 and display(s) 16, respectively.

Figure 2:
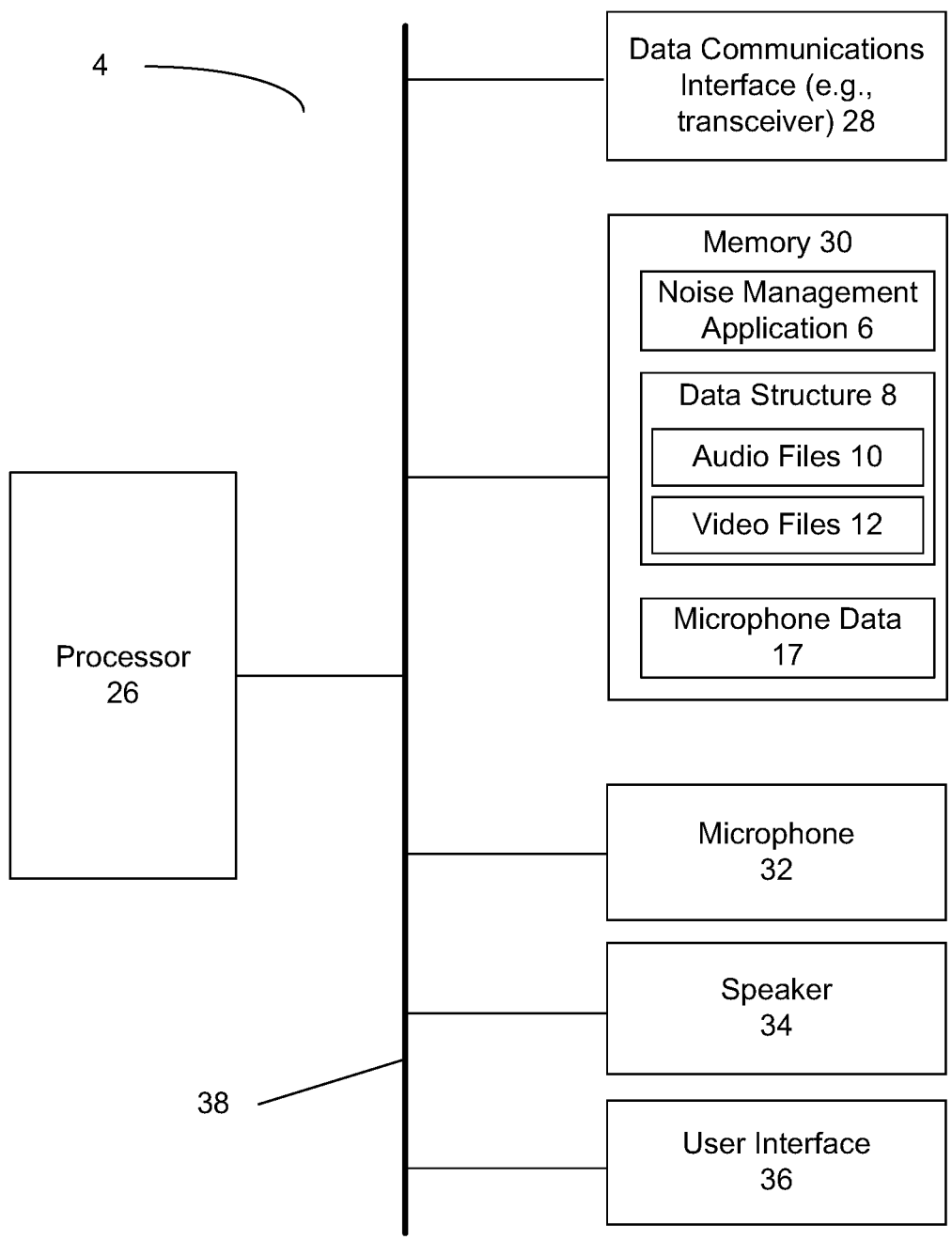
FIG. 2 illustrates a simplified block diagram of the computing device shown in FIG. 1.

FIG. 2 illustrates a simplified block diagram of the computing device 4 shown in FIG. 1 capable of performing sound masking and outputting selected associated visuals. The computing device 4 includes a processor 26 operably coupled via an interconnect 38 to a data communications interface 28, memory 30, a microphone 32, a speaker 34, and a user interface 36. In one example, data communications interface 28 is a wireless communications transceiver (e.g., utilizing IEEE 802.11 communications) operable to receive or identify location data from communication network(s) 18.

Memory 30 stores a data structure 8 (e.g., a database, table, or any other file/memory structure) for storing sound masking data, including noise masking audio files 10, video files 12, and microphone data 17. Memory also stores noise management application 6 configured and operating as described herein. Memory 30 may include a variety of memories, and in one example includes SDRAM, ROM, flash memory, or a combination thereof. Memory 30 may further include separate memory structures or a single integrated memory structure. In one example, memory 30 may be used to store passwords, network and telecommunications programs, and/or an operating system (OS).

Processor 26, using executable code and applications stored in memory, performs the necessary functions associated with managing the noise masking and audio files and associated visuals within an environment such as a building open space as described herein. In one example, processor 26 further interacts with server 20 to receive noise masking audio files 22 and video files 24. In one example, processor 26 is a high performance, highly integrated, and highly flexible system-on-chip (SoC), including signal processing functionality. Processor 26 may include a variety of processors (e.g., digital signal processors), with conventional CPUs being applicable. User interface 36 allows for manual communication between the system user (e.g., a system administrator) and the computing device 4, and in one example includes an interface allowing the system user to manually input a current location of the building in which the system 2 is being used.

In one example operation, a system user selects from the noise masking sound audio files 10 and video files 12. The selected noise masking sound audio file is output to a BMR loudspeaker 14 and the selected video file is output to a video display 16.

In a further example operation, a location data is received or identified at computing device 4 (e.g., the sound masking system). In one example, the location data is an Internet Protocol address and the user location is determined from the Internet Protocol address. In one example, the location data includes a city, state, or region data. Computing device 4 may, for example, receive or identify its geo-location utilizing an IP address, Wi-Fi connection data, or Global Positioning System (GPS) data. A noise masking sound audio file is selected from the selectable noise masking sound audio files 10 and a video file from the selectable video files 12 utilizing the location data. The selected noise masking sound audio file is output to a BMR loudspeaker 14 and the selected video file is output to a video display 16. In one example, the selectable noise masking sound audio files 10 and the selectable video files 12 are correlated to a plurality of locations in a data structure. In further examples, other parameters are utilized to select the sound audio file 10 and video file 10, including a current time of day or current weather condition.

In one example, the noise masking sound audio file 10 includes a nature associated sound and the video file 12 includes a nature associated visual. For example: (1) the nature associated sound includes a water sound and the nature associated visual includes a water visual, (2) the nature associated sound includes a beach sound and the nature associated visual includes a beach visual, or (3) the nature associated sound includes a forest sound and the nature associated visual includes a forest visual. In one example, the video file selected and the noise masking sound audio file selected are associated (e.g., selecting a particular noise masking sound audio file automatically selects a particular video file and vice versa) at the sound masking system.

In one example configuration and operation, noise management application 6 is configured to receive a microphone data 17 from at least one of the plurality of microphones 15 and adjust the sound masking sound output (e.g., adjusts a volume level of the noise masking sound) at one or more of the plurality of BMR loudspeakers 14. For example, microphone data 17 includes noise level measurements, noise frequency data, or voice activity detection data determined from sound detected at the plurality of microphones 15. In one example, noise management application 6 selects a noise masking sound audio file from the selectable noise masking sound audio files 10 and the video file from the selectable video files 12 utilizing the a microphone output data from the plurality of microphones 15.

Figure 3:
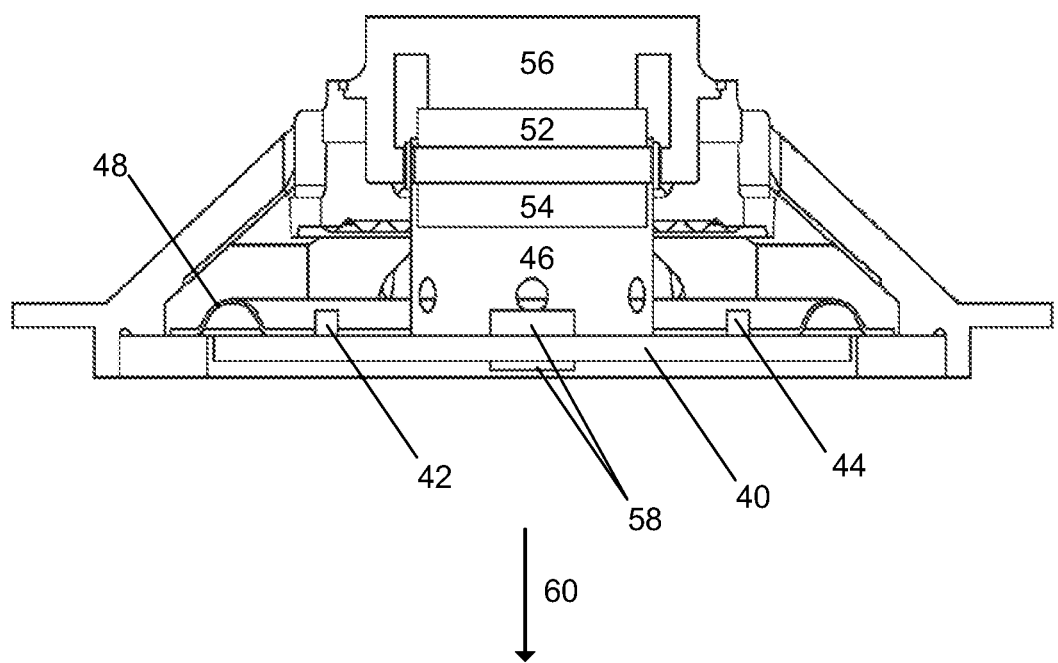
FIG. 3 is an illustration of a balanced mode radiator loudspeaker used in the sound masking system shown in FIG. 1 in one example.

FIG. 3 is an illustration of a BMR loudspeaker 14 in one example. As illustrated in FIG. 3, BMR loudspeaker 14 is an assembly oriented in a down-fire configuration to emit sound in downward direction 60 (also shown in FIGS. 6 and 7). BMR loudspeaker 14 employs a flat diaphragm (i.e., panel) 40 attached to a voice coil 46, a magnet 52, magnet 54, U-yoke 56, and damper 58. BMR loudspeaker 14 includes surround 48 attached to the rear of the diaphragm 40. BMR loudspeaker 14 includes balancing masses 42, 44 attached to the rear of the diaphragm 40. Balancing masses 42, 44 restore the acoustical behavior of a "free disc" and are placed to the left and right of the voice coil 46 at predetermined diameters. The location of the balancing masses 42, 44 (and voice coil 46) is determined by evaluating the diaphragm 40's mechanical admittance at radial positions varying from the center to the edge of the diaphragm 40 and determining its average over all modes in the frequency range of interest. The values of the masses are scaled by the relative ratios of diameters. Flat diaphragm 40 is selected to have a stiffness such that the first bending mode is located in the frequency range where the diaphragm would otherwise start to beam sound. The surround 49 is selected to have a weight, damping, and diameter to achieve good control for all bending modes.

BMR loudspeaker 14 attempts to achieve the acoustic response of a "free disc", as opposed to the acoustic response of a "piston in an infinite baffle" which has the well-known "ka dilemma" of increasing directivity (lobing or beaming) with increasing frequency or decreasing diaphragm size. This is done by exploiting the modal behavior of the diaphragm 40 and designing a limited number of evenly spread modes to radiate purposefully in the frequency region where pistonic motion begins to become directive. In one example, BMR loudspeaker 14 is one such as that is available from Tectonic Elements Ltd, United Kingdom.

Figure 4:
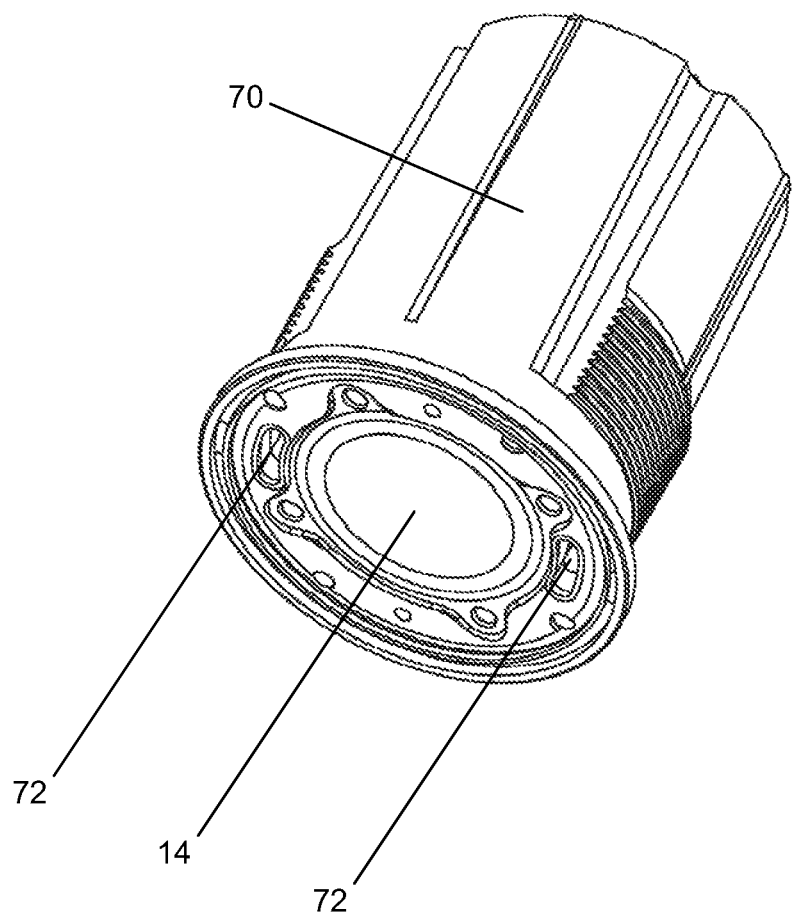
FIG. 4 is an illustration of a balanced mode radiator loudspeaker with enclosure in one example.

FIG. 4 is an illustration of a balanced mode radiator loudspeaker housing 70 containing a BMR loudspeaker 14 in one example. Loudspeaker housing 70 includes tuned bass reflex port(s) 72, 74 allowing air to circulate within housing 70 and resonate at a lower frequency than the loudspeaker, thereby improving low frequency response.

Figure 5:
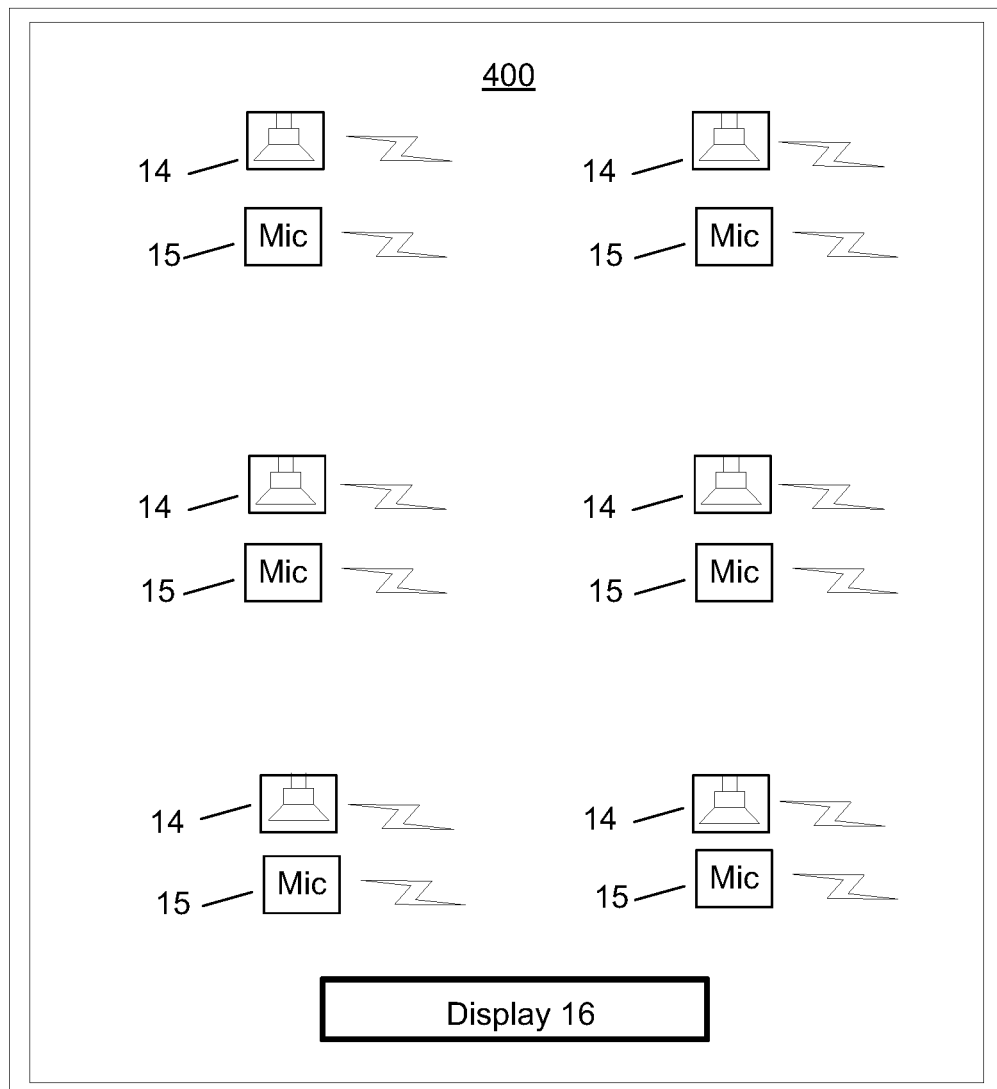
FIG. 5 illustrates placement of a plurality of balanced mode radiator loudspeakers and microphones shown in FIG. 1 in a space in one example.

FIG. 5 illustrates placement of a plurality of BMR loudspeakers 14 and microphones 15 shown in FIG. 1 in a space 400 in one example. Microphones 15 may be arranged in a ceiling area to detect sound in the space 400.

Use of BMR loudspeakers 14 instead of conventional pistonic loudspeakers has previously unrecognized and unexpected advantages in systems to mask open space noise. With the same loudspeaker spacing (i.e., the same number of BMR loudspeakers for a given space) within a ceiling grid, the resultant sound field is richer and more detailed, which is due to the wider dispersion at higher frequencies. Sound quality is improved with better spatial uniformity of high frequencies than pistonic loudspeakers. Alternatively, at a slightly wider spacing (i.e., a fewer number of BMR loudspeakers for a given space size), the BMR loudspeakers can provide a similar sound field as that provided by pistonic loudspeakers using less loudspeakers, saving on cost and installation. In one example described in further detail below, in a space with an area of 10000 sq. ft., a ceiling height of 10 ft., and a listener height of 4 ft., 36 BMR speakers provide the same coverage (at 2 kHz) as 64 pistonic loudspeakers, a 44% reduction in the number of required speakers.

Undesirable high-frequency beaming that occurs with conventional pistonic loudspeakers is very apparent in a down-fire configuration; listeners in the open space 400 below hear these frequencies as very pronounced when directly underneath the loudspeaker (on-axis). This is especially audible as a person moves throughout the open space and is detrimental to spatial uniformity. As the BMR loudspeakers 14 do not beam as much, higher frequencies are less pronounced on-axis, contributing to better high-frequency spatial uniformity within the open space.

Illustrated in FIG. 5, there is one BMR loudspeaker 14 for each microphone 15 located in a same geographic sub-unit. In further examples, the ratio of BMR loudspeakers 14 to microphones 15 may be varied. In one example configuration, each microphone of the plurality of microphones 15 is associated with a BMR loudspeaker of the plurality of BMR loudspeakers 14. For example, each microphone of the plurality of microphones 15 is correlated based on geographic location to a corresponding BMR loudspeaker of the plurality of BMR loudspeakers 14. In one example, each microphone 15 location and BMR loudspeaker 14 location within open space 400, and a correlated microphone 15 and loudspeaker 14 pair located within the same sub-unit, is recorded during an installation process of the system 2.

The plurality of BMR loudspeakers 14 and video display 16 are under control of the computing device 4. In one example, computing device 4 interfaces with server 20 to receive audio data and video data. Placement of a plurality of the BMR loudspeakers 14 and video display 16 in a space 400 is shown in one example. For example, space 400 may be an open space such as a large room of an office building. The video display 16 is arranged to be easily visible within the open space. For example, video display 16 is a direct lit led array display, projected image onto a wall mounted screen, or a flat panel LCD.

Computing device 4 performs operations as described herein to output sound masking signals and video signals. Computing device 4 is capable of electronic communications with each BMR loudspeaker 14, microphone 15, and display 16 via either a wired or wireless communications link. For example, computing device 4, BMR loudspeakers 14, microphones 15, and display 16 are connected via one or more communications networks such as a local area network (LAN) or an Internet Protocol network.

In one example, each BMR loudspeaker 14, microphone 15, and display 16 is network addressable and has a unique Internet Protocol address for individual control. BMR loudspeaker 14 includes a processor operably coupled to a network interface, output transducer, memory, amplifier, and power source. BMR loudspeaker 14 also includes a near-field wireless interface utilized to link with a control device such as computing device 4. In one example, the network interface is a wireless transceiver and accompanying antenna for communications with a wireless router or access point. For example, the wireless transceiver is a Bluetooth or IEEE 802.11 transceiver. In a further example, the network interface is a wired interface, such as that an Ethernet jack used to connect to computing device 4 over the Internet or a local area network. The processor allows for processing data, including managing sound masking signals over the network interface, and may include a variety of processors (e.g., digital signal processors), with conventional CPUs being applicable. Similarly, display 16 also includes a processor operably coupled to a network interface, wireless interface, output transducer, memory, amplifier, and power source.

In the system illustrated in FIG. 5, sound is output from BMR loudspeakers 14 corresponding to a sound masking signal configured to mask open space noise. In one example, the sound masking signal is a random noise such as pink noise. The sound operates to mask open space noise heard by a person in open space 400. In one example, the masking levels are advantageously dynamically adjusted in response to noise level measurements made in the open space 400. In one example, masking levels are adjusted on a speaker-by-speaker basis in order to address location-specific noise levels.

In one example, the speaker sound is the sound of a flow of water. In one example, the sound corresponding to the flow of water is a recording of a natural flow of water or an electronically synthesized sound of flow of water. In one example, the sound corresponding to a flow of water has been optimized to mask open space noise. For example, a recording of the flow of water has been processed to add 2-4 dB per octave higher frequency boost.

In one example, the BMR loudspeaker 14 is one of a plurality of speakers disposed at varying distances from the video display 16, where an output level of the speaker sound from a speaker is adjusted based on the distance of the BMR loudspeaker 14 from the video display 16. The speaker output level is adjusted so that the sound level of the flowing water (the sound from a speaker at video display 16 combined with the sound of flowing water output from BMR loudspeaker 14) is consistent throughout the open space.

In one example, based on measured noise levels, sound masking system 2 makes changes to the physical environment, including (1) increasing or reducing the volume of the sound masking in order to maintain an optimal masking level, even as speech noise levels change, (2) modifying the masking sound source and/or type—for example, from a sound of birds chirping to a sound of a waterfall, or (3) modifying the masking sound spectrum—for example, from a filtered pink noise to a noise that is closer to brown noise—in response to volume or noise density information, or (4) increasing or decreasing the lighting level, or to changing the color of ambient lighting in open space 400. In one example, sound masking system 2 modifies the visual displayed on video display 16 responsive to a change in the sound environment (i.e., where the sound audio file 10 is changed, the video file 12 is changed).

Figure 6:
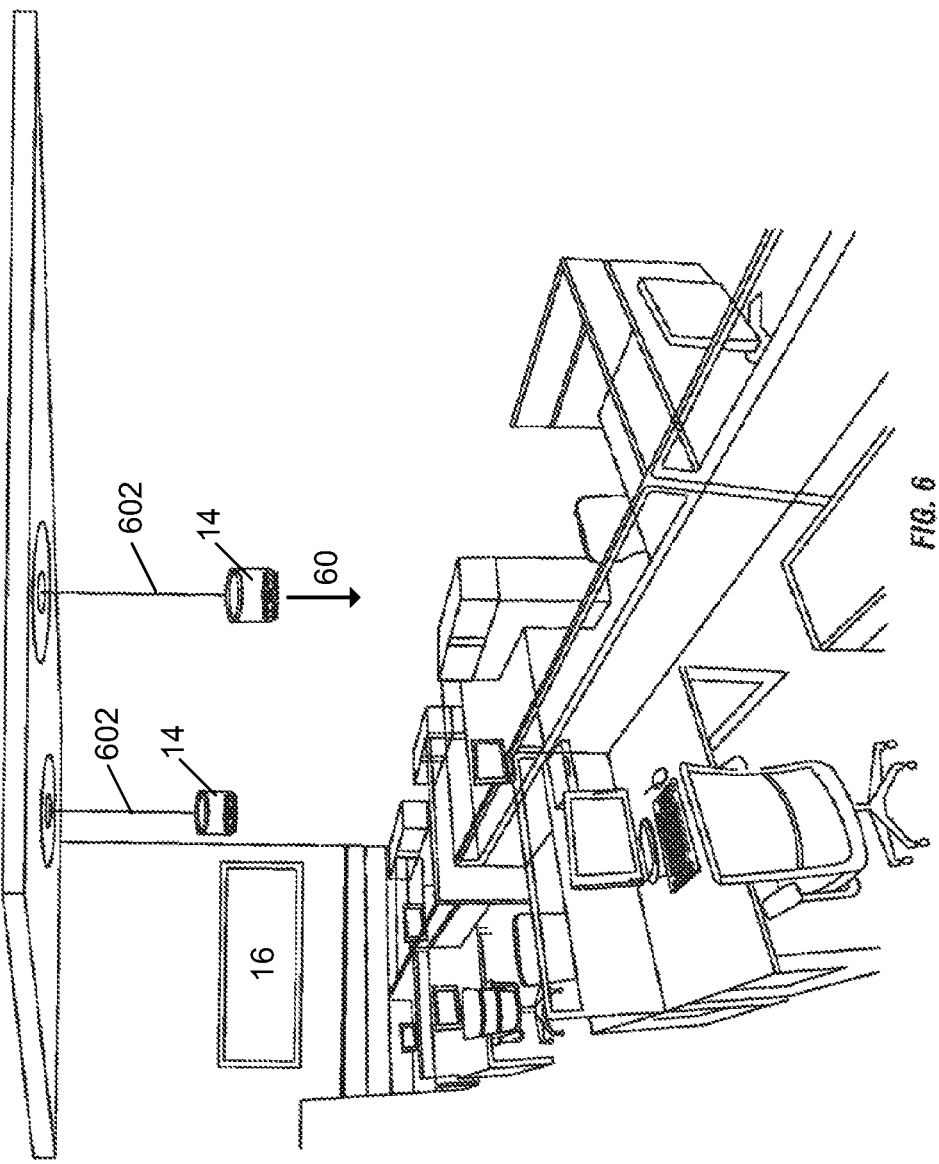
FIG. 6 illustrates placement of the balanced mode radiator loudspeakers and display device shown in FIG. 5 in one example.

FIG. 6 illustrates placement of the BMR loudspeakers 14 and video display 16 shown in FIG. 5 in one example. FIG. 6 illustrates placement of the BMR loudspeakers 14 in a down-fire (i.e., direct field) configuration, whereby the speakers 14 are oriented to direct sound downwards. The masking sound travels directly from the speakers to a listener without interacting with any reflecting or transmitting feature.

In one example, the BMR loudspeakers 14 are disposed at a desired variable height above an open space floor. The total number of BMR loudspeakers 14 within the open space may be adjusted based on the desired variable height above the open space floor. In one example, the desired variable height is determined by a wire cable 602 or pole having a first end coupled to the ceiling and a second end coupled to a BMR loudspeaker. Advantageously, the number of BMR loudspeakers 14 required for a given sized open space can be adjusted by adjusting this variable height. As the length of wire cable 602 is shortened, the number of BMR loudspeakers 14 is reduced.

In one example, system 2 receives a desired variable height above an open space floor for a BMR loudspeaker 14. For example, the desired variable height may be input by a user. System 2 determines a total number of BMR loudspeakers 14 within the open space utilizing the desired variable height above the open space floor.

Figure 7:
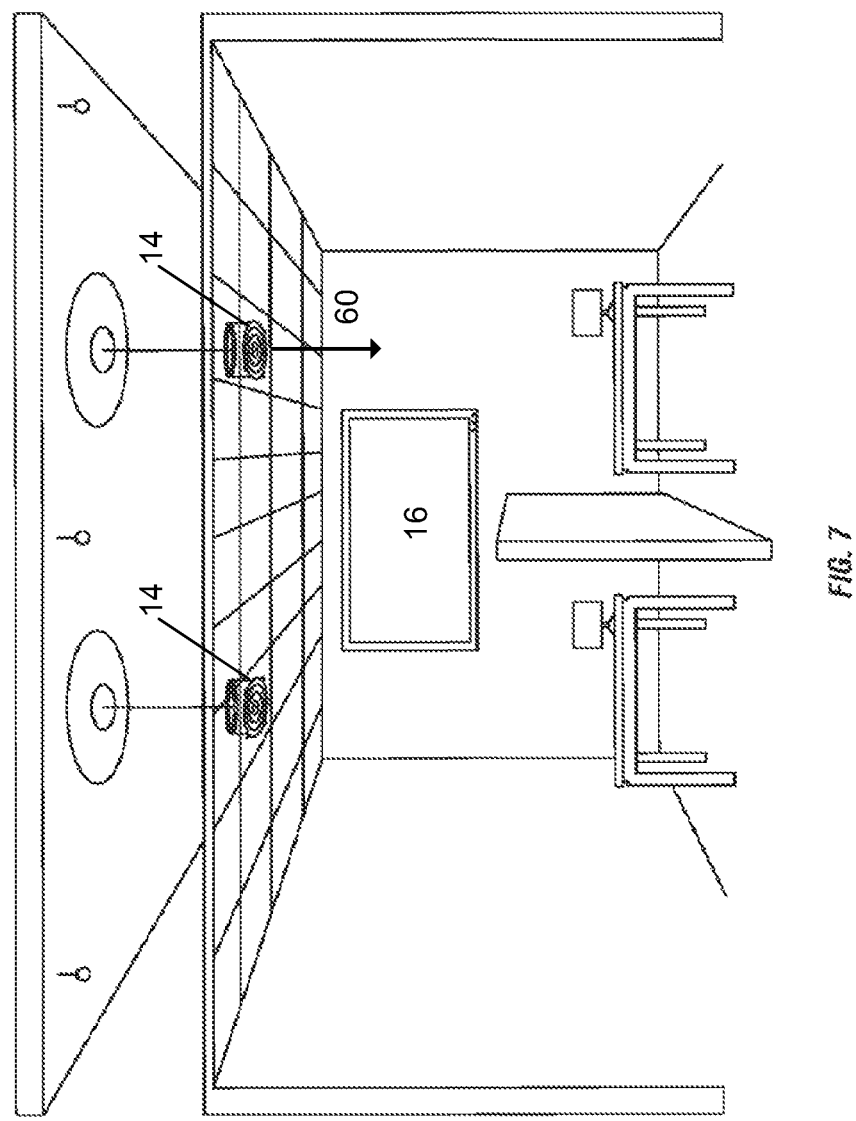
FIG. 7 illustrates placement of the balanced mode radiator loudspeakers and display device shown in FIG. 5 in a further example.

FIG. 7 illustrates placement of the BMR loudspeakers 14 and video display 16 shown in FIG. 5 in a further example. FIG. 7 illustrates placement of the BMR loudspeakers 14 in a direct field configuration, whereby the speakers are oriented to direct sound downwards. In this example, space 400 includes ceiling tiles below a ceiling deck, with a plenum area disposed there between. BMR loudspeakers 14 are disposed at the fixed height of the ceiling tiles so that the BMR loudspeakers 14 are flush with the ceiling tiles, whereby the ceiling tiles include sound apertures. The masking sound travels directly from the speakers to a listener without interacting with any reflecting or transmitting feature.

Figure 8:
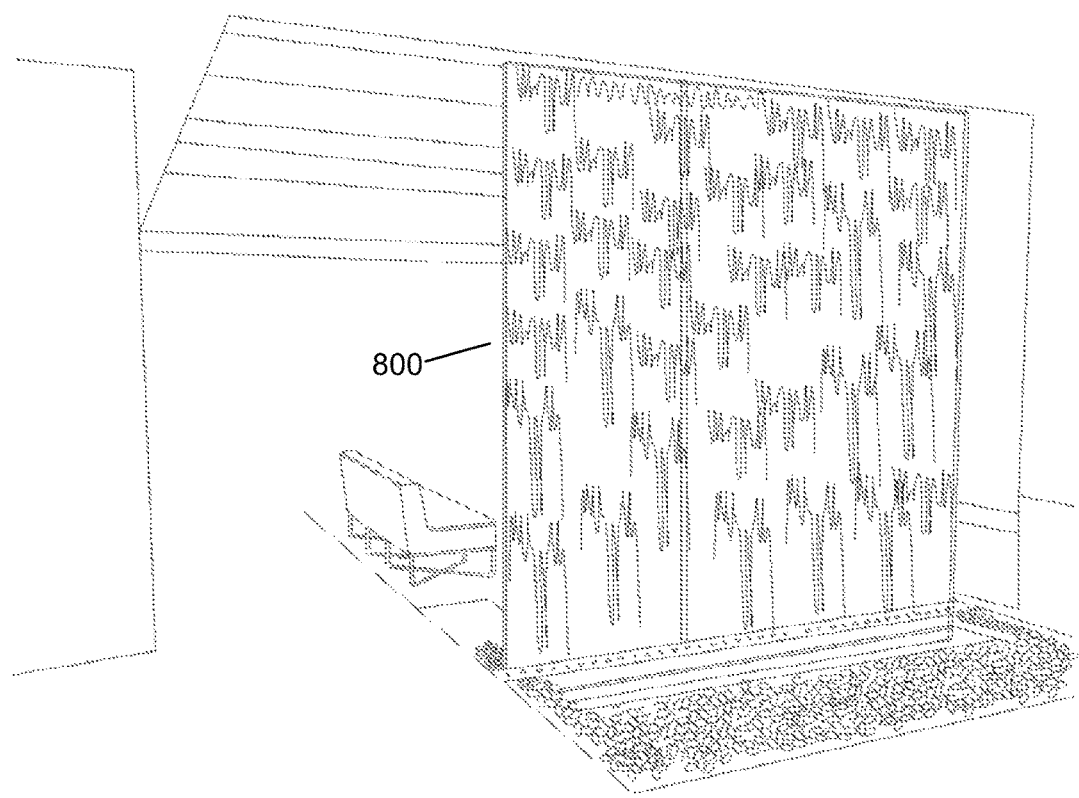
FIG. 8 illustrates a water element system in one example.

FIG. 8 illustrates a water element system 800 in one example. In one embodiment, system 2 further includes a water element system 800 (i.e., a physical display of moving water) in the open space in addition to video display 16. In a further embodiment, water element system 800 is used in place of video display 16. The water element system 800 is arranged to be easily visible within the open space. Water sound from water element system 800 also operates to mask open space noise 620. The intelligibility of speech and other noise within space 400 is reduced by the sound from water element system 800. In one example, the water element system 800 is a floor-to-ceiling waterfall including an upper reservoir which receives water from a water supply, and a lower reservoir (e.g., a floor basin) to receive water which has fallen from the upper reservoir.

The waterfall includes water recirculation tubes for recirculating water from the lower reservoir back to the upper reservoir, and a recirculation pump to recirculate the water through the recirculation tubes up to the upper reservoir. In one implementation, water falls from upper reservoir to the lower reservoir along the surfaces of one or more vertical glass panels disposed between the upper reservoir and the lower reservoir. The flow rate and water volume of the waterfall may be adjusted to control the water sound level.

In one example, each BMR loudspeaker 14 is one of a plurality of speakers disposed at varying distances from the water element system 800, where an output level of the speaker sound from a speaker is adjusted based on the distance of the BMR loudspeaker 14 from the water element system 800. The speaker output level is adjusted so that the sound level of the flowing water (i.e., the sound from the water element system 800 combined with the sound of flowing water output from BMR loudspeaker 14) is consistent throughout the open space. At locations in close proximity to water element system 800, water sound from the water element system 800 is heard. As such, the output level of a BMR loudspeaker 14 in close proximity to water element system 800 is reduced relative to a BMR loudspeaker 14 further away. In one example, the speaker sound has been processed to match the frequency characteristics of the water sound emanating from water element system 800 so that the user is under the impression that the speaker sound is emanating from water element system 800 instead of BMR loudspeaker 14.

In this manner, the water element system 800 may be constructed so that it need not be so loud so as to be heard throughout the open space in order for the water sound to be an effective noise masker. This reduces the possibility that workers in close proximity to the water element system 800 will find the water sound too loud and annoying while allowing workers further away to hear water sound at a sufficient level to provide effective masking of the open space noise.

Figure 9:
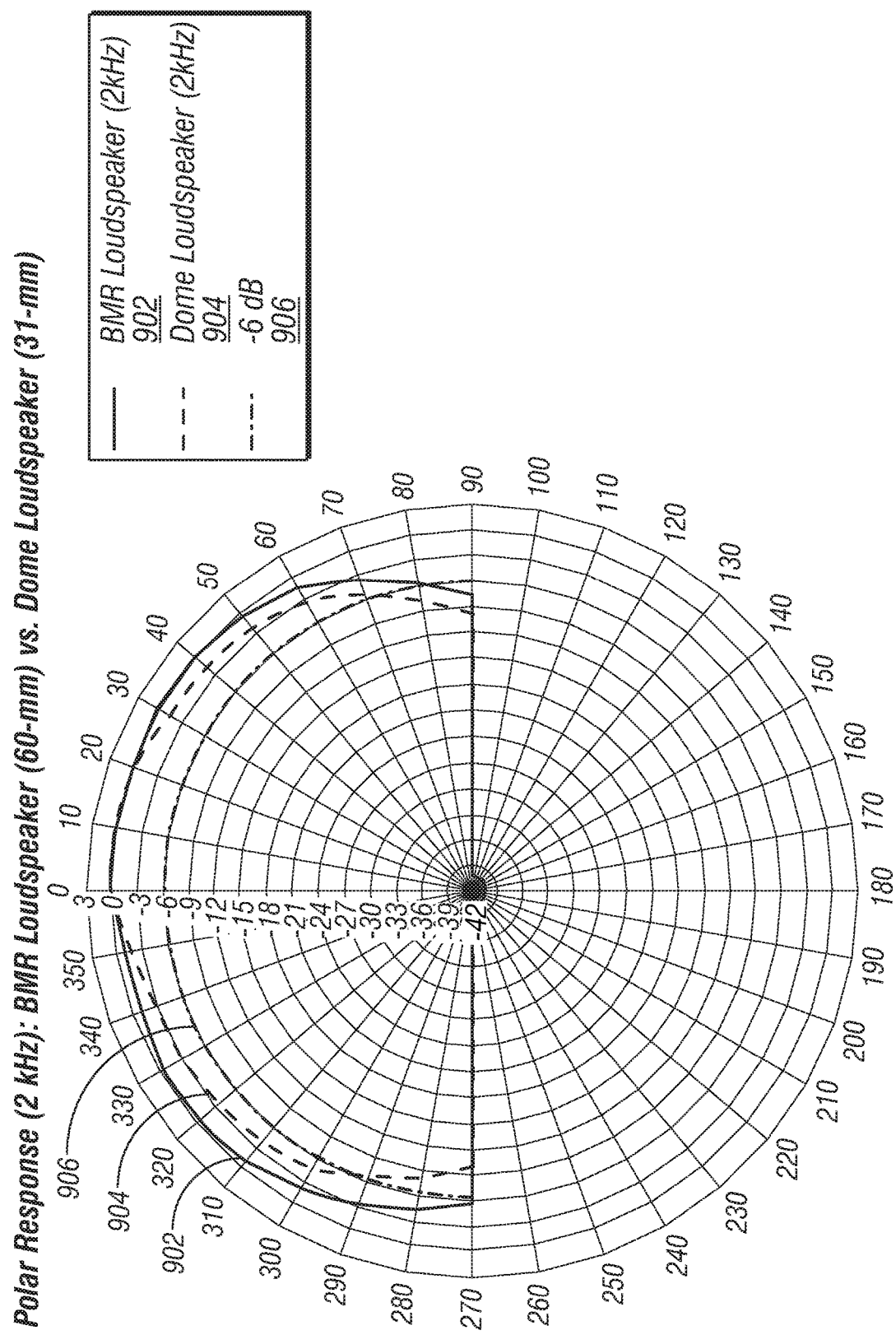
FIG. 9 is a diagram illustrating a polar response of a balanced mode radiator loudspeaker in comparison to a pistonic speaker in one example.

FIG. 9 is a diagram illustrating a polar response of a BMR loudspeaker 14 in comparison to a pistonic speaker in one example. Illustrated is the polar response 902 at 2 kHz of a 60-mm BMR loudspeaker 14 in a ported enclosure and the polar response 904 of a 31-mm dome (i.e., pistonic) loudspeaker in a ported enclosure. The BMR loudspeaker 14 exhibits wider dispersion at this 2 kHz frequency which contributes most to masking speech. As illustrated, for any rotation off-axis (e.g., 320 degrees), polar response 902 of BMR loudspeaker 14 shows less loss (i.e., less decrease in gain) relative to polar response 904 of the dome loudspeaker. BMR loudspeakers 14 of varying sizes were tested. BMR loudspeakers 14 having larger diameters continued to provide excellent and improved high frequency dispersion relative to the pistonic speaker.

Figure 10:
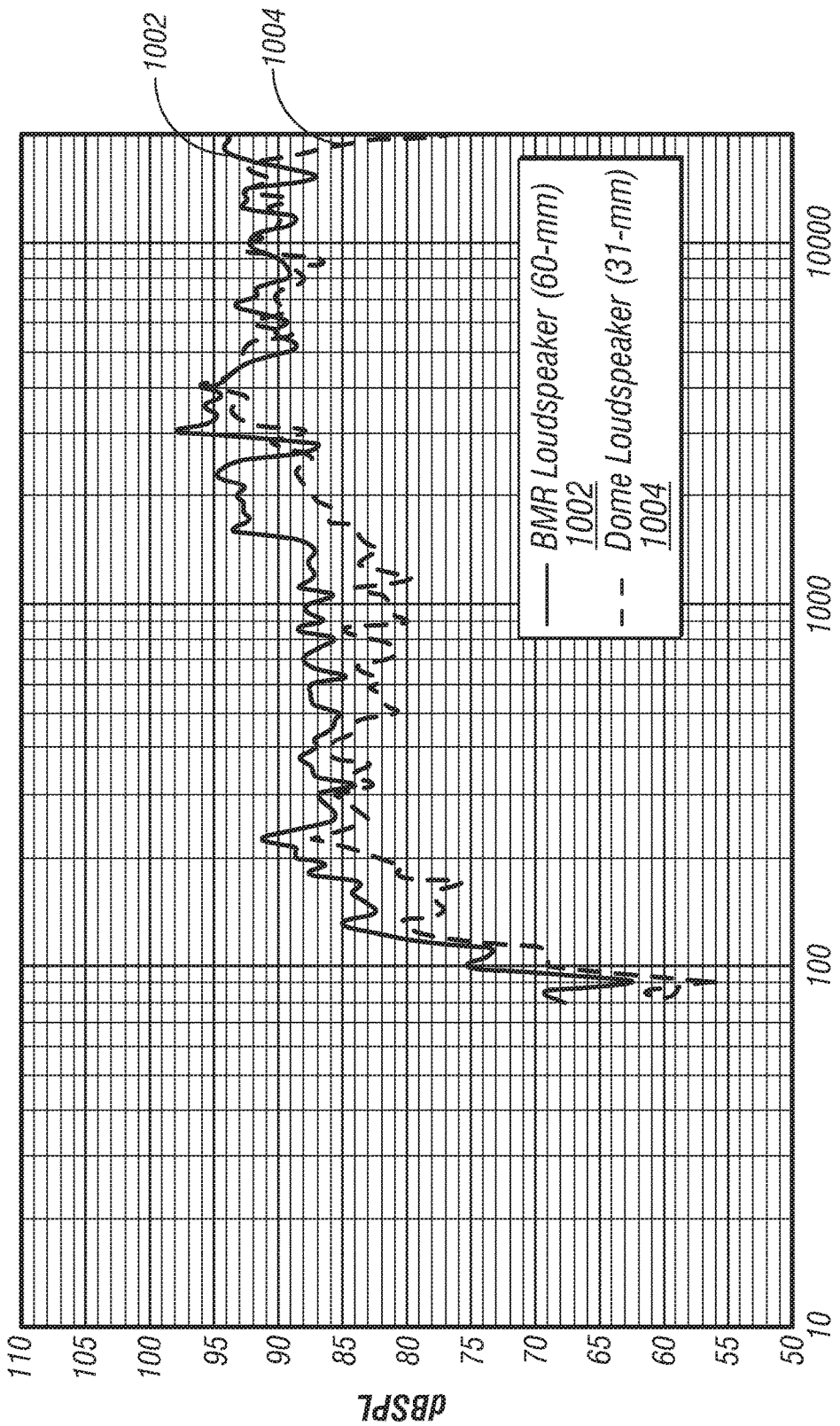
FIG. 10 is a diagram illustrating a frequency response of a balanced mode radiator loudspeaker in comparison to a pistonic speaker in one example.

FIG. 10 is a diagram illustrating a frequency response of a BMR loudspeaker 14 in comparison to a pistonic speaker in one example. Illustrated is the frequency response 1002 of a 60-mm BMR loudspeaker 14 in a ported enclosure and the frequency response 1004 of a 31-mm dome loudspeaker in a ported enclosure. As shown, BMR loudspeaker 14 exhibits provides better low-frequency sensitivity and much greater mid-frequency sensitivity than the dome loudspeaker. As such, BMR loudspeaker 14 provides superior performance in outputting both nature sounds in combination with random pink or white noise. Advantageously, utilizing BMR loudspeakers 14, one or more noise masking sound audio file 10 may include a random noise (e.g., pink or white noise) including a frequency range of 160-8000 Hz and a natural sound (e.g., water sound or forest sound such as birds or crickets) including a frequency range of 120-10000 Hz.

Figure 11:
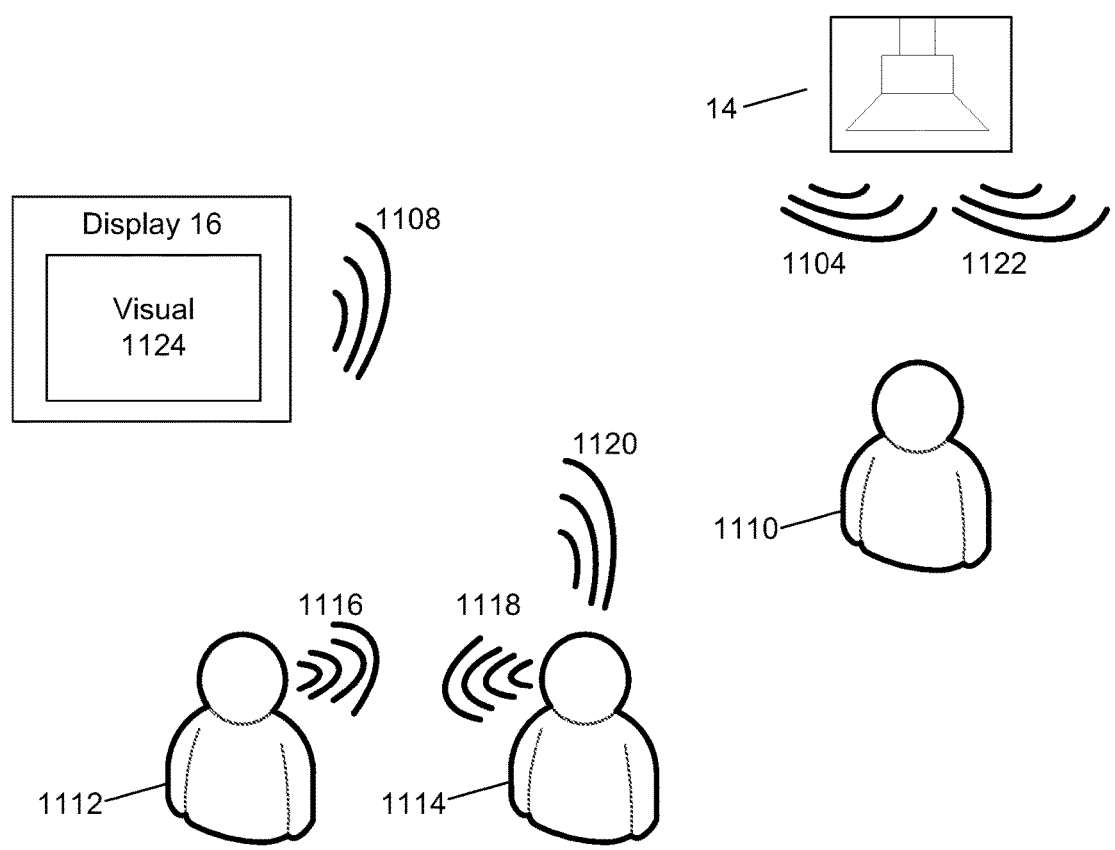
FIG. 11 illustrates a sound masking usage scenario in one example.

FIG. 11 illustrates a sound masking usage scenario in one example. A conversation participant 1112 is in conversation with a conversation participant 1114 in the vicinity of person 1110 in an open space. Open space noise 1120 includes components of speech 1116 from participant 1112 and speech 1118 from conversation participant 1114.

Sound 1104 output from BMR speaker 14 operates to mask open space noise 1120 heard by a person 1110. Sound 1104 corresponds to output of a noise masking audio file 10 selected by noise management application 6. Visual 1124 is shown on video display 16. Visual 1124 corresponds to output of a video file 12 selected by noise management application 6. Video display 16 may also include a speaker which outputs sound 1108 matching sound 1104. Sound 1108 from display 16 also operates to mask open space noise 1120. The intelligibility of speech 1116 and speech 1118 is reduced by sound 1104 and sound 1108.

In one example, sound 1104 is a sound of flowing water, such as that of a waterfall or flowing stream. Visual 1124 is selected to correspond to sound 1104 or be compatible with sound 1104. If sound 1104 is a sound of flowing water, visual 1124 is an image of flowing water, such as that of an image of a waterfall or a flowing stream. The presence of visual 1124 shown on video display 16 advantageously increases the user comfort when listening to water sound 1104 output from BMR loudspeaker 14 as the person 1110 has a frame of reference as to the source of the water sound 1104.

Playing water sounds alone through the sound masking BMR loudspeaker 14, without a visual water element, causes discomfort among workers, who feel as though the water is dripping down from the ceiling or that it has no logical source. A logical source of the water sound is needed.

In one example, the noise masking audio file 10 played to generate sound 1104 is a recording of a natural sound or an electronically synthesized sound. In one example, the sound 1104 has been optimized to mask open space noise. For example, a recording of a natural sound has been processed to add 2-4 dB per octave higher frequency boost.

In the scenario illustrated in FIG. 11, a sound 1122 is output from BMR loudspeaker 14 corresponding to a noise configured to mask open space noise in addition to the sound 1104. For example, where sound 1104 is a water sound, sound 1122 may be a random noise such as pink noise. For example, sound 1122 is generated from the same or a different noise masking audio file as sound 1104. Both sound 1104 and sound 1122 operate to mask open space noise 1120 heard by person 1110.

In one example, the speaker sound 1104 corresponding to the flow of water is optimized to mask a higher frequency open space noise than the noise sound 1122 configured to mask open space noise. For example, a frequency boost of 2-4 dB per octave is added in the processing of the recorded water sound. In this manner, noise sound 1122 can be selected to mask lower frequency open space noise. For example, noise sound 1122 can be selected to be a pink noise which is more appealing to be heard by persons instead of a white noise, which is slightly more effective in masking higher frequency open space noise but more unpleasant for persons to hear.

In one example, a method for masking open space noise (e.g., noise 1120) includes outputting a first masking sound (e.g., sound 1122, such as a pink noise) to mask an open space noise (e.g., noise 1120) in an open space, and masking the audibility of the first masking sound (e.g., sound 1122) utilizing a second masking sound (e.g., sound 1104), the second masking sound (e.g., sound 1104) also operable to mask the open space noise (e.g., noise 1120). This methodology allows the level of the first masking sound (e.g., sound 1122) to be increased (i.e., to produce a greater masking effect of noise 1120) without being perceived by person 1110. This is advantageous where persons prefer to hear the sound of pink noise at a reduced level or not to hear the sound of pink noise. In one example, the output levels of sound 1104 and noise sound 1122 are determined experimentally and/or based on listener preference. The use of sound 1104 and sound 1122 produces a greater masking effect than the use of either sound 1104 or sound 1122 alone, while providing for increased listener comfort.

Figure 12:
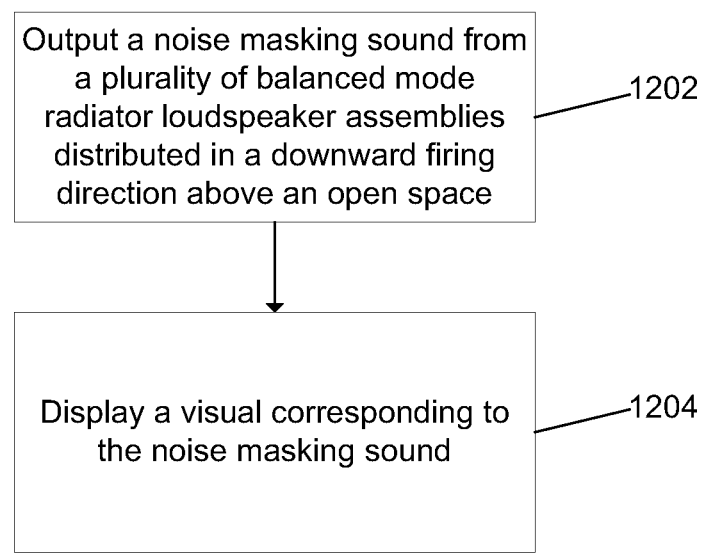
FIG. 12 is a flow diagram illustrating sound masking in one example.

FIG. 12 is a flow diagram illustrating sound masking in one example. For example, the process illustrated may be implemented by the system shown in FIG. 1. At block 1202, a noise masking sound is output from a plurality of BMR loudspeakers distributed in a down-fire direction above an open space. In one example, the noise masking sound output includes a random noise (e.g., pink or white noise) including a frequency range of 160-8000 Hz and a natural sound (e.g., water sound or forest sound) including a frequency range of 120-10000 Hz.

In one example, the plurality of BMR loudspeakers are disposed at a desired variable height above an open space floor. For example, the desired variable height is determined by an extension segment having a first end coupled to a ceiling and a second end coupled to a BMR loudspeaker. In one example, the total number of BMR loudspeakers within the open space is adjusted based on the desired variable height above the open space floor.

At block 1204, a visual corresponding to the noise masking sound is displayed. In one example, displaying the visual corresponding to the noise masking sound includes displaying a nature visual on a video display device. In one example, the noise masking sound includes a water sound and displaying the visual corresponding to the noise masking sound includes displaying a water element system, the water element system generating a sound of flowing water. For example, the water element system generating the sound of flowing water includes a floor-to-ceiling waterfall.

In one example, the noise masking sound includes a nature associated sound and the visual includes a nature associated visual. For example, (1) the nature associated sound includes a water sound and the nature associated visual includes a water visual, (2) the nature associated sound includes a beach sound and the nature associated visual includes a beach visual, or (3) the nature associated sound includes a forest sound and the nature associated visual includes a forest visual.

In one example, the process further includes receiving a desired variable height above an open space floor for each BMR loudspeaker. A total number of BMR loudspeakers within the open space is determined utilizing the desired variable height above the open space floor.

In one example, the process further includes receiving a microphone data from a plurality of microphones disposed in the open space. The noise masking sound is adjusted utilizing the microphone data. For example, the sound masking volume level, masking type, or frequency is adjusted. Each microphone of the plurality of microphones may be associated with a BMR loudspeaker.

EXAMPLE

In one example, the number of BMR loudspeakers to provide a similar sound field quality required for a given space size is reduced by 44%. Determination of the number of loudspeakers for a given space size in one example, and resulting improvement using BMR speakers, is shown in FIGS. 9 and 13A-16C. In this example, comparison between a 60 mm BMR speaker and 30 mm dome speaker is illustrated for a room size of 10,000 square feet, ceiling height of 10 feet, listener height of 4 feet, and coverage pattern of edge-to-edge.

First, the linear dispersion of each speaker is calculated, as shown in FIGS. 9 and 13A-13C. To obtain the linear dispersion, first the conical dispersion of each loudspeaker is measured in an anechoic chamber to obtain polar plots, indicating off-axis degradation. Conical dispersion is the angle at which the response falls by −6 dB. In this example, analysis was done for 2-kHz, which is of primary interest in masking of speech intelligibility; designing for coverage at 2-kHz is fairly standard for AV industry. FIG. 9 illustrates the obtained polar plots.

Figure 13C:
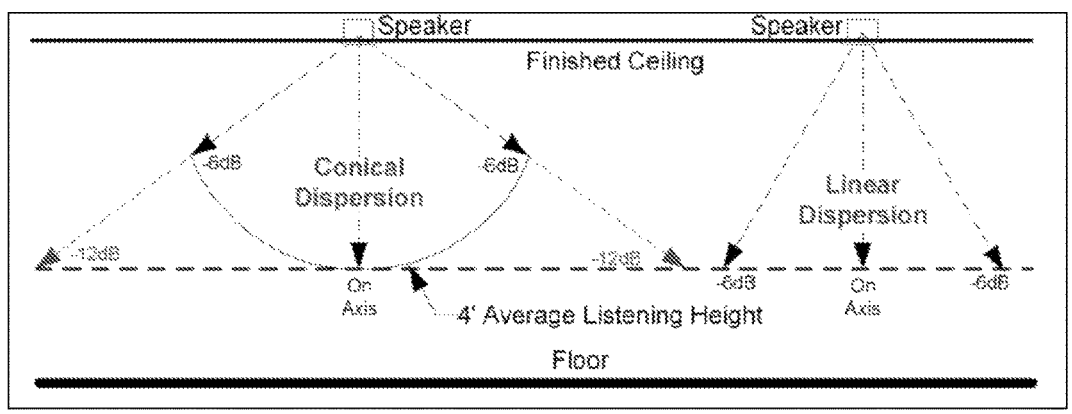
FIG. 13C is a sample graphic illustrates the relationship between conical dispersion and linear dispersion.

FIG. 13A and FIG. 13B illustrate calculation of the linear dispersion for the BMR speaker and dome speaker, respectively. At 5-degree increments, known and relative attenuation due to distance are added. Wider angles need to travel farther to reach the listening plane, set in this example at 4-ft. above the floor. Losses due to dispersion (from the polar plots) are combined with attenuation due to distance for overall attenuation at the listening plane. The angle at which the combined loss due to dispersion and attenuation due to distance is −6 dB is known as the linear dispersion and is used for calculating coverage. Due to slight asymmetry in the polar plots, the right and left-hand sides are averaged to determine linear dispersion angle. Linear dispersion is always narrower than conical dispersion. FIG. 13C is a sample graphic illustrates the relationship between conical dispersion and linear dispersion.

Figure 14A:
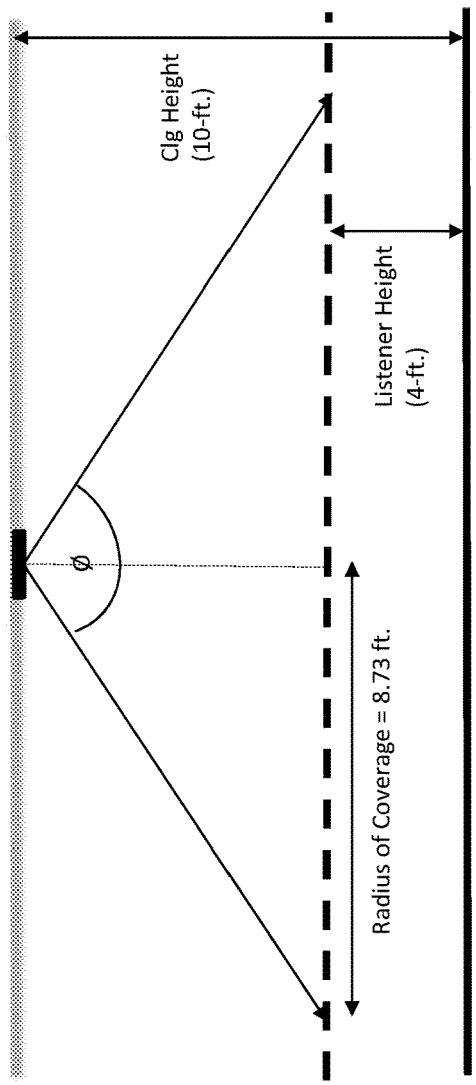
FIG. 14A illustrates calculation of the radius of coverage for the BMR speaker.
Figure 14B:
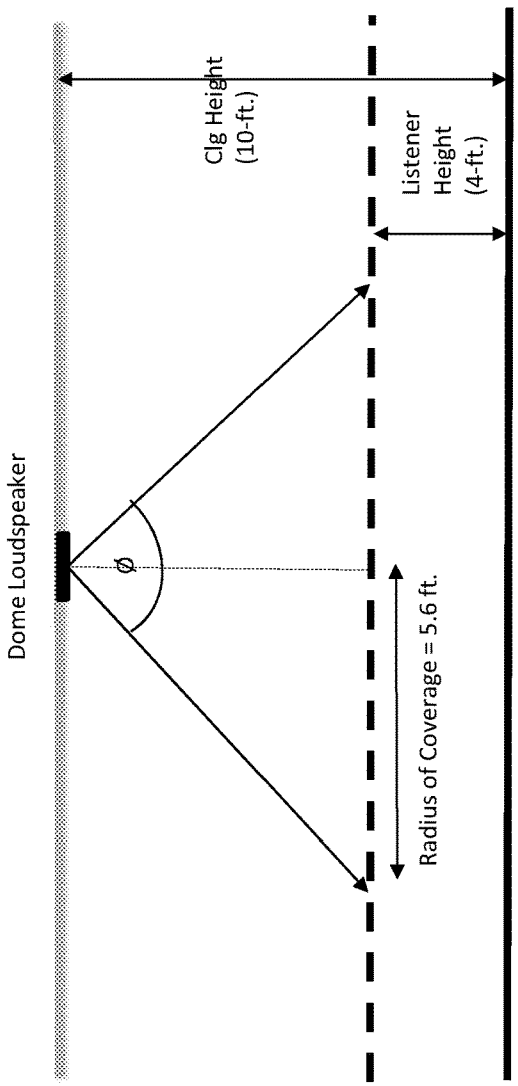
FIG. 14B illustrates calculation of the radius of coverage for the dome speaker.

After the linear dispersion of both the BMR speaker and the dome speaker is obtained, it is utilized in calculating the "radius of coverage" for each speaker. FIG. 14A illustrates calculation of the radius of coverage for the BMR speaker. FIG. 14B illustrates calculation of the radius of coverage for the dome speaker. FIG. 14C illustrates the improved radius of coverage of the BMR speaker over the dome speaker.

Figure 15:
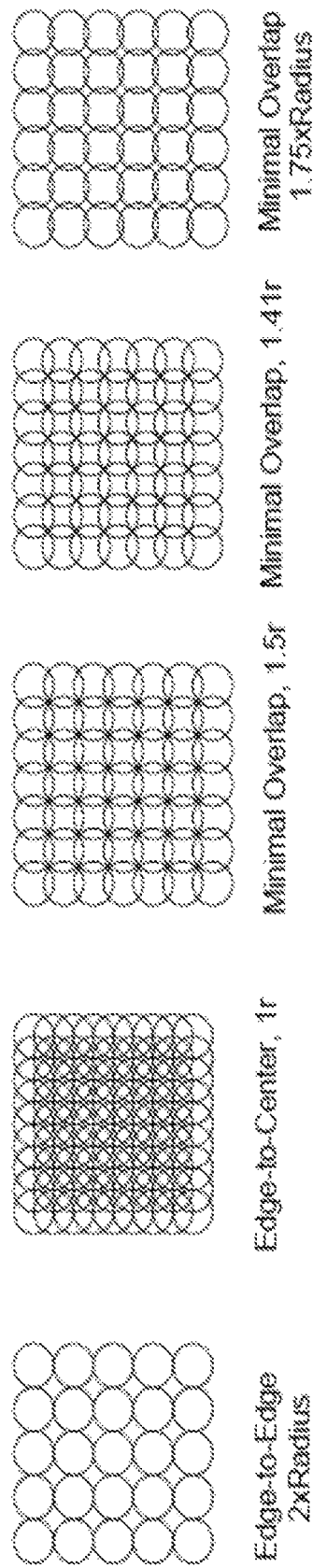
FIG. 15 illustrates non-limiting examples of various coverage patterns.
Figure 16A:
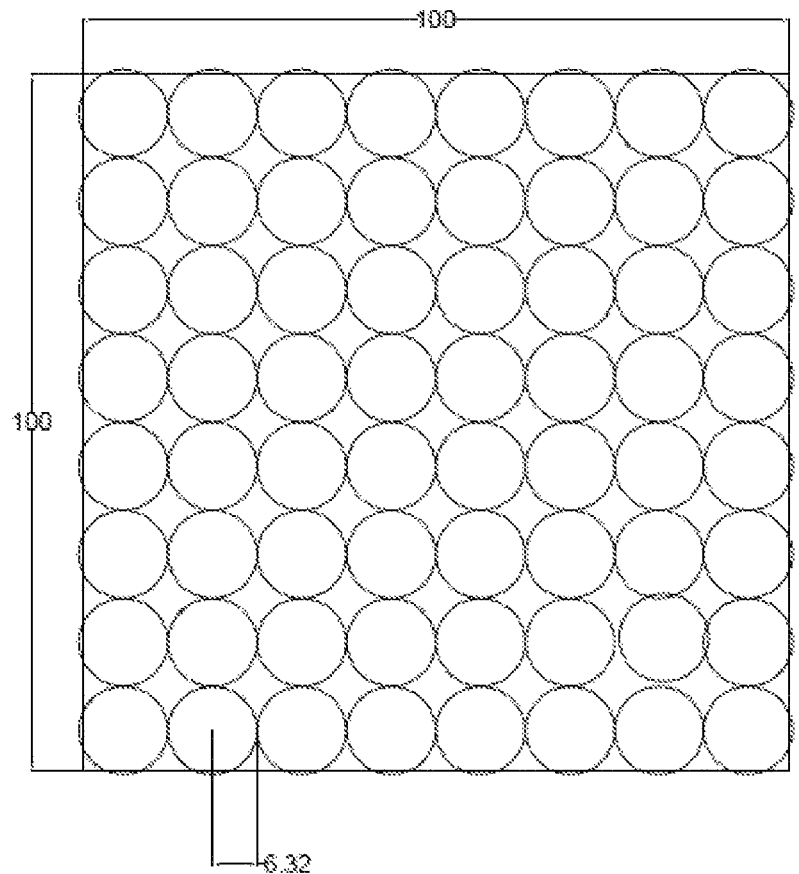
FIG. 16A illustrates the obtained coverage pattern for the dome speaker and result of 64 required speakers.
Figure 16B:
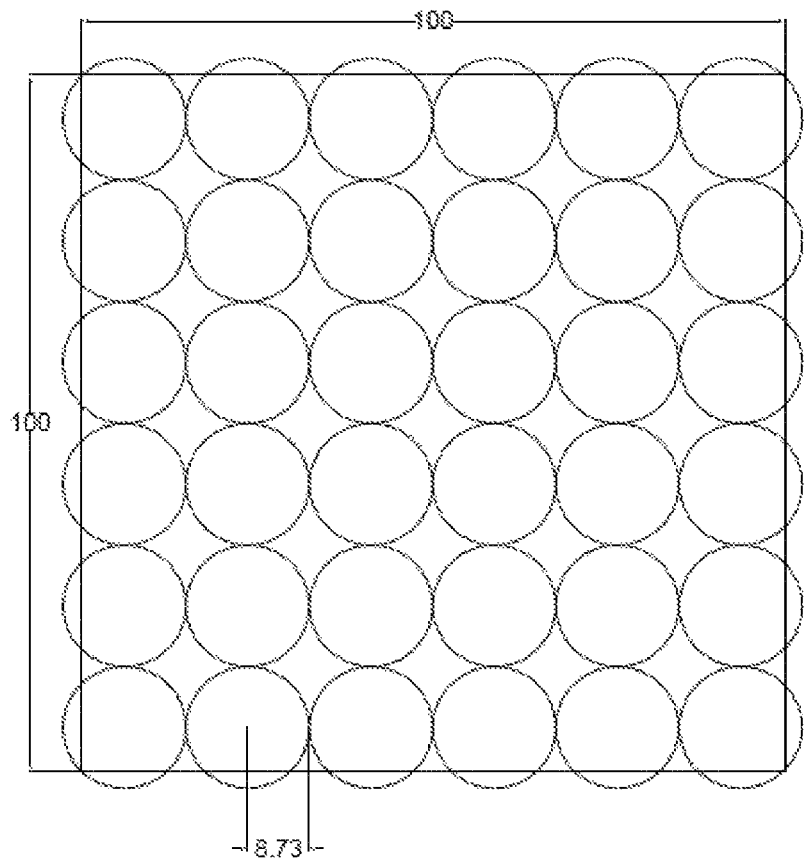
FIG. 16B illustrates the obtained coverage for the BMR speaker and result of 36 required speakers.

Next, a circle with radius equal to the radius of coverage is overlaid on an architectural floor plan or reflected ceiling plan. In this example, a generic, symmetric square space is used for ease of comparison. A coverage pattern based on desired overlap is selected. Selection may be based, for example, on program goals or user preference. In this example, an "edge-to-edge" coverage is selected where the radius of coverage from one speaker abuts but does not overlap with the radius of coverage from another speaker. FIG. 15 illustrates non-limiting examples of various coverage patterns which may be used. Coverage circles with appropriate spacing to cover the space (e.g., utilizing an "edge-to-edge" coverage pattern) are added, producing the required number of loudspeakers. This process is repeated for both the BMR speaker and the dome speaker to provide the desired comparison of the number of BMR speakers relative to the number of dome speakers. FIG. 16A illustrates the obtained coverage pattern for the dome speaker and result of 64 required speakers. FIG. 16B illustrates the obtained coverage for the BMR speaker and result of 36 required speakers, a 44% reduction in the number of required speakers to obtain a similar sound field quality. FIG. 16C illustrates a summary table of the data shown in FIGS. 16A and 16B.

While the exemplary embodiments of the present invention are described and illustrated herein, it will be appreciated that they are merely illustrative and that modifications can be made to these embodiments without departing from the spirit and scope of the invention. Acts described herein may be computer readable and executable instructions that can be implemented by one or more processors and stored on a computer readable memory or articles. The computer readable and executable instructions may include, for example, application programs, program modules, routines and subroutines, a thread of execution, and the like. In some instances, not all acts may be required to be implemented in a methodology described herein.

Terms such as "component", "module", and "system" are intended to encompass software, hardware, or a combination of software and hardware. For example, a system or component may be a process, a process executing on a processor, or a processor. Furthermore, a functionality, component or system may be localized on a single device or distributed across several devices. The described subject matter may be implemented as an apparatus, a method, or article of manufacture using standard programming or engineering techniques to produce software, firmware, hardware, or any combination thereof to control one or more computing devices.

Thus, the scope of the invention is intended to be defined only in terms of the following claims as may be amended, with each claim being expressly incorporated into this Description of Specific Embodiments as an embodiment of the invention.

What is claimed is:

1. A system for masking open space noise comprising:
a plurality of balanced mode radiator loudspeakers, each balanced mode radiator loudspeaker arranged above an open space in a down-fire configuration to output a speaker sound downward into the open space, and each balanced mode radiator loudspeaker comprising a voice coil, a diaphragm, and one or more mass objects coupled to the diaphragm;
a display device disposed in the open space; and
one or more computing devices comprising:
one or more processors;
one or more memories storing:
one or more selectable noise masking sound audio files and one or more selectable video files; and
one or more application programs executable by the one or more processors configured to output a noise masking sound audio file selected from the one or more selectable noise masking sound audio files at the plurality of balanced mode radiator loudspeakers and output a video file selected from the one or more selectable video files at the display device.

2. The system of claim 1, wherein the plurality of balanced mode radiator loudspeakers are disposed at a desired variable height above an open space floor.

3. The system of claim 2, wherein a total number of balanced mode radiator loudspeakers within the open space is selected based on the desired variable height above the open space floor.

4. The system of claim 1, wherein the noise masking sound audio file comprises a random noise comprising a frequency range of 160-8000 Hz and a natural sound comprising a frequency range of 120-10000 Hz.

5. The system of claim 1, wherein the display device is arranged to be visible from any location within the open space.

6. The system of claim 1, further comprising a water element system generating a sound of flowing water.

7. The system of claim 1, further comprising a plurality of microphones, wherein each microphone of the plurality of microphones is associated with a balanced mode radiator loudspeaker of the plurality of balanced mode radiator loudspeakers.

8. The system of claim 7, wherein the one or more application programs include instructions to select the noise masking sound audio file from the one or more selectable noise masking sound audio files and the video file from the one or more selectable video files utilizing a microphone output data from the plurality of microphones.

9. The system of claim 1, wherein the one or more selectable noise masking sound audio files comprises a nature associated sound and the one or more selectable video files comprises a nature associated visual.

10. The system of claim 9, wherein the nature associated sound comprises a water sound and the nature associated visual comprises a water visual.

11. The system of claim 9, wherein the nature associated sound comprises a beach sound and the nature associated visual comprises a beach visual.

12. The system of claim 9, wherein the nature associated sound comprises a forest sound and the nature associated visual comprises a forest visual.

13. A method for masking open space noise comprising:
outputting a noise masking sound from a plurality of balanced mode radiator loudspeakers distributed in a down-fire direction above an open space, the plurality of balanced mode radiator loudspeakers disposed at a desired height above an open space floor and wherein a total number of balanced mode radiator loudspeakers within the open space is selected based on the desired height above the open space floor; and displaying a visual corresponding to the noise masking sound.

14. The method of claim 13, wherein the noise masking sound comprises a random noise comprising a frequency range of 160-8000 Hz and a natural sound comprising a frequency range of 120-10000 Hz.

15. The method of claim 13, further comprising:
receiving a microphone data from a plurality of microphones disposed in the open space; and
adjusting the noise masking sound utilizing the microphone data.

16. The method of claim 13, wherein displaying the visual corresponding to the noise masking sound comprises displaying a nature visual on a video display device.

17. The method of claim 13, wherein the noise masking sound comprises a water sound and displaying the visual corresponding to the noise masking sound comprises displaying a water element system, the water element system generating a sound of flowing water.

18. The method of claim 17, wherein the water element system generating the sound of flowing water comprises a floor-to-ceiling waterfall.

19. The method of claim 13, wherein the noise masking sound comprises a nature associated sound and the visual comprises a nature associated visual.

20. A system for masking open space noise comprising:
a plurality of balanced mode radiator loudspeakers arranged above an open space to output a noise masking sound in a down-fire direction, each balanced mode radiator loudspeaker of the plurality of balanced mode radiator loudspeakers comprising a voice coil, a diaphragm, and one or more mass objects coupled to the diaphragm;
a plurality of microphones; and
one or more computing devices comprising:
one or more processors;
one or more memories storing one or more application programs executable by the one or more processors, the one or more application programs comprising instructions to receive a microphone data from at least one of the plurality of microphones and adjust the noise masking sound output at one or more of the plurality of balanced mode radiator loudspeakers.

21. The system of claim 20, wherein the plurality of balanced mode radiator loudspeakers are disposed at a desired variable height above an open space floor.

22. The system of claim 21, wherein the desired variable height is determined by an extension segment having a first end coupled to a ceiling and a second end coupled to a balanced mode radiator loudspeaker.

23. The system of claim 21, wherein a total number of balanced mode radiator loudspeakers within the open space is selected based on the desired variable height above the open space floor.

24. The system of claim 20, wherein the microphone data comprises noise level measurements, noise frequency data, or voice activity detection data determined from sound detected at the plurality of microphones.

25. The system of claim 20, wherein the noise masking sound output comprises a random noise comprising a frequency range of 160-8000 Hz and a natural sound comprising a frequency range of 120-10000 Hz.

26. The system of claim 20, further comprising a display device outputting a visual matching the noise masking sound.

27. The system of claim 26, wherein the visual comprises a water visual, a beach visual, or a forest visual.

* * * * *